United States Patent
Tadman et al.

[11] Patent Number: 5,983,266
[45] Date of Patent: Nov. 9, 1999

[54] CONTROL METHOD FOR MESSAGE COMMUNICATION IN NETWORK SUPPORTING SOFTWARE EMULATED MODULES AND HARDWARE IMPLEMENTED MODULES

[75] Inventors: Mark Jeffrey Tadman; Richard Mike Holmes; Leon Arie Krantz, all of Mission Viejo, Calif.

[73] Assignee: Unisys Corporation, Blue Bell, Pa.

[21] Appl. No.: 08/886,817

[22] Filed: Mar. 26, 1997

[51] Int. Cl.[6] ............................. G06F 13/38; G06F 15/17
[52] U.S. Cl. ........................ 709/216; 709/230; 710/200
[58] Field of Search ................... 392/200.43, 200.45, 392/200.46, 200.6, 680, 868, 726, 733; 709/213, 215, 216, 230, 300; 710/48, 200, 244

[56] References Cited

U.S. PATENT DOCUMENTS

| | | | |
|---|---|---|---|
| 3,670,306 | 6/1972 | Fox et al. | 340/172.5 |
| 4,649,473 | 3/1987 | Hammer et al. | 364/200 |
| 4,766,530 | 8/1988 | Roslund | 364/200 |
| 4,914,653 | 4/1990 | Bishop et al. | 370/85.6 |
| 5,241,635 | 8/1993 | Papadoppulos et al. | 395/375 |
| 5,274,637 | 12/1993 | Sakamura et al. | 370/85.5 |
| 5,333,269 | 7/1994 | Calvignac et al. | 395/200 |
| 5,357,612 | 10/1994 | Alaiwan | 395/200 |
| 5,418,913 | 5/1995 | Fujimoto | 395/200 |
| 5,434,975 | 7/1995 | Allen | 395/200 |
| 5,491,799 | 2/1996 | Kreuzenztein et al. | 395/200.08 |
| 5,515,537 | 5/1996 | Tavares et al. | 395/732 |
| 5,560,019 | 9/1996 | Narad | 395/733 |
| 5,704,047 | 12/1997 | Scneeberger | 395/200.65 |

*Primary Examiner*—Mark H. Rinehart
*Attorney, Agent, or Firm*—Alfred W. Kozak; Mark T. Starr; Steven B. Samuels

[57] ABSTRACT

A method for message transfers between digital modules in a network where some modules are hardware implemented and some modules are emulated in software. An Auxiliary Message Arbitrator Unit utilizes Main Memory storage for messages destined for receiving modules. Algorithmic sequencing means maintains chronological transfer operations of messages and uses hard and soft Interrupt signal queues to inform respective hard and soft modules of pending messages for them to retrieve.

6 Claims, 11 Drawing Sheets

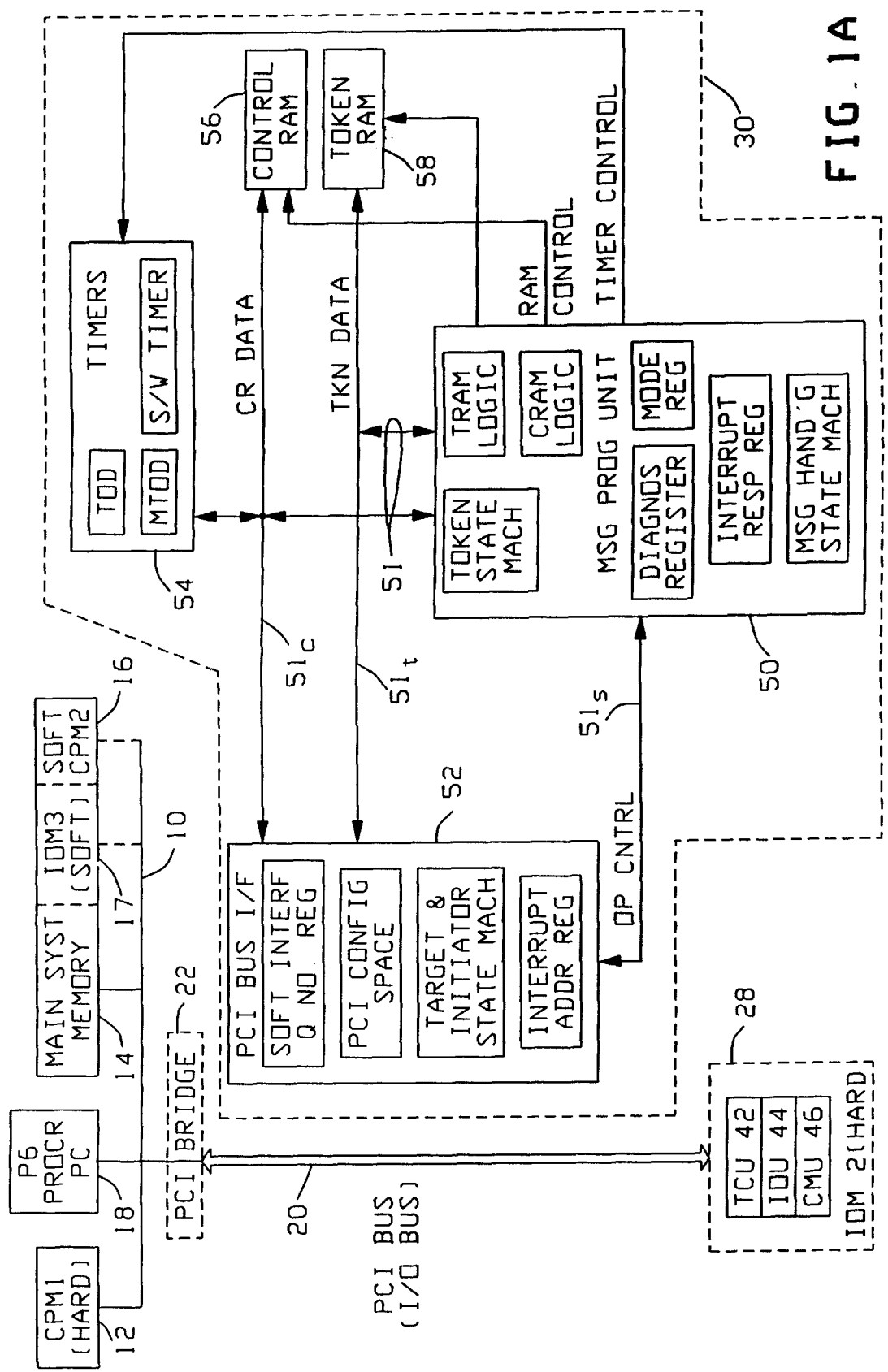

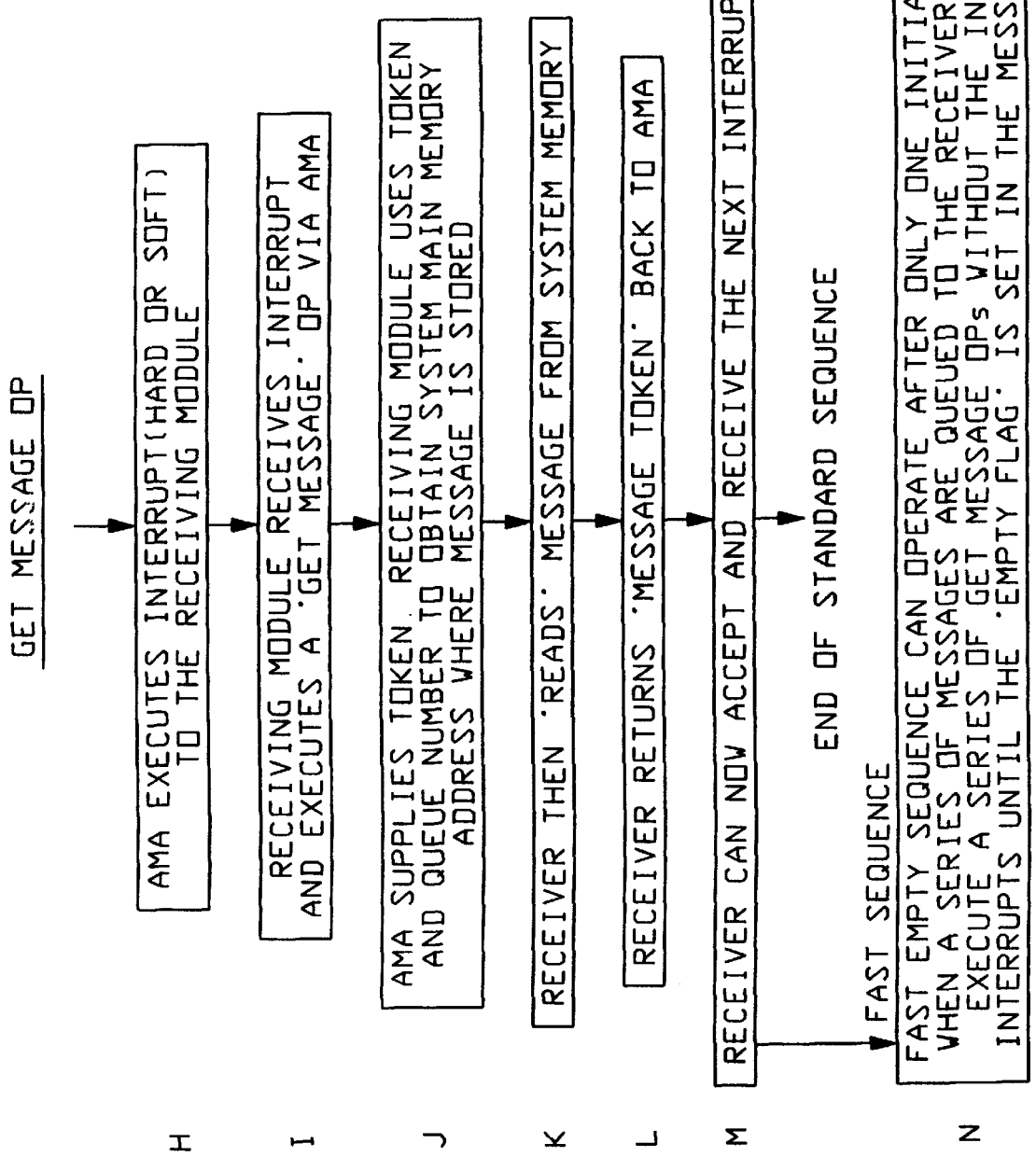

CONTROL METHOD FOR MESSAGE COMMUNICATION IN NETWORK SUPPORTING SOFTWARE EMULATED MODULES AND HARDWARE IMPLEMENTED MODULES

CROSS REFERENCES TO RELATED APPLICATIONS

This application is related to several co-pending applications designated below and are incorporated herein by reference. These applications include:

U.S. Ser. No. 886,818, now issued at U.S. Pat. No. 5,842,003 filed Mar. 26, 1997 and entitled AUXILIARY MESSAGE ARBITRATOR FOR DIGITAL MESSAGE TRANSFER SYSTEM IN NETWORK OF HARDWARE MODULES U.S. Ser. No. 886,816 filed Mar. 26, 1997 and entitled MESSAGE TRANSFER SYSTEM AND CONTROL METHOD FOR MULTIPLE SENDING AND RECEIVING MODULES IN A NETWORK SUPPORTING HARDWARE AND SOFTWARE EMULATED MODULES U.S. Ser. No. 886,819 filed Mar. 26, 1997 and entitled INTERRUPT HANDLING SYSTEM FOR MESSAGE TRANSFER PROTOCOL IN NETWORK HAVING MIXED HARDWARE AND SOFTWARE MODULES.

FIELD OF THE INVENTION

This system relates to methods for message transfers between sending and receiving modules in a network where certain modules are software emulated and other modules are hardware implemented.

BACKGROUND OF THE INVENTION

Present day computer networks today involve the interconnection of many types of digital modules which are required to communicate with each other both as a sender and a receiver.

A typical example of a complex network is shown in FIG. 2 where a system bus 10 connects a series of digital modules such as an A Series Central Processor (Unisys) Module 12, a Main Memory 14, a Processor Unit 18 10 such as an Intel (P6) Pentium or Pentium Pro. The system bus 10 is connected to system bus bridge units 22 and 24 which connect to other networks. Thus, bus 10b connects the system bus 10 to the I/O bus 20. The I/O bus 20 is here called a PCI bus. The PCI bus 20 connects another series of digital modules shown as an Input/Output Module 28, (IOM 2), an Auxiliary Message Arbitration Unit AMA 30, and another bridge unit 32 designated as PCI-EISA Bridge. The bridge unit 32 connects to a standard EISA bus 32e which connects to other EISA peripheral units designated 36.

In FIG. 2, the Input/Output Module, IOM 28, includes a group of digital modules designated as the Task Control Unit, TCU 42, Input/Output Unit IOU, 44, and Channel Manager Unit, CMU 46.

In the digital network shown in FIG. 2, it is necessary that a suitable protocol and proper control of message transfers be arranged for optimum operation of the system.

Present technology has made it possible to interconnect many digital modules such as processors, memories and Input/Output units in order to build powerful and effective computer systems. The performance of such multi-digital network systems depends on many factors such as the control of message flow, the scheduling and the interconnection methods used between the various digital modules, and also the implementation of fault free communication between modules.

One of the significant problems in message passing is the orderly and efficient transfer of messages from one digital module to another, and also the feature of message preservation when delivery of a message is not possible. Certain problematic conditions occur in networks which utilize both hardware modules and software modules. Basically, hardware modules when running uninterrupted work fast in handling and processing the data that is passed through them. On the other hand, software modules operating on a time-shared operating system are not completely dedicated to one type of operation, but are involved with task switching into different programs from time to time and thus, one earlier program may be delayed because the software is running on a second program and has not yet returned to the first program.

Thus, systems which used software solutions to try to handle the orderly transmission of messages ran into considerable difficulties. Some of these software solutions involved link lists in memory and assigned a number in memory to each message so that the messages would be accessed sequentially according to the number of the message. Then when that numbered message was used, the number was incremented and placed back in memory.

On these types of solutions using software, the queuing solution and the incrementing number solution leads to difficulties when you have multiple senders. Then it is necessary to make arrangements to see that the various sending modules are coordinated and not in conflict with each other. If a link list is built, it is not possible then to have two senders putting something into the list at the same time where they could interfere with each other.

Likewise, if there were two senders looking at a particular message number, the system would have to do something to prevent the senders from getting the same value of the number for their messages. Since there is a finite time from when the first sender gets the number, until he increments it and stores it back, then if the second sender asks for a number during that interval, the second sender is going to get the same number as the first sender and they both will put their messages in the same slot number. Thus, one sender will wipe out the message of the other sender.

It would be possible to prevent some of the software problems by having locking operations in memory, but again the problem with locking operations occurs when one software module obtains the lock which prevents other modules from doing anything until that module uses the lock, then the platform operating system takes the processor for some period of time causing every other sender to wait until a sender gets the processor back in order to do what is necessary to release the lock.

The present system provides a module which operates in a dedicated fashion as hardware to handle the message transmission control operations and the hardware responds rapidly and quickly since it does not have any need for a locking operation, because it is atomic, and because it guarantees that the two senders will not get the same number value. Thus, there is a fast certain and definite chronological system for message transfers that is done rapidly through hardware control modules, while at the same time it still can handle and be responsive to software modules operating in the system, thus allowing a mixture of hardware and software modules without the software modules slowing down the system.

GENERAL OVERVIEW

One of the major features of the present system involves message order preservation, chronological sequences of message delivery and priorities whereby local messages, that is to say, messages from one processor to another, (where both processors are executing on the same computer system) are given higher priority than messages flowing from one computer system to another computer system.

The presently described system involves an Auxiliary Message Arbitrator Unit 30, AMA, which uses main system memory 14 to hold messages and utilizes an internal AMA board to provide the algorithmic control factors required. There is no need for any additional software tasks so that messages can flow between the sending and receiving units in a very direct and rapid fashion without any task switching overhead for software programs.

The Auxiliary Message Arbitrator 30 (FIG. 1A) of the present system can be used effectively in a classical network where there is one computer system consisting of multiple processors, all using one common memory subsystem. Quite contrarily, other prior art systems required specialized router node controllers and transposer modules for each node that was involved in sending and receiving messages.

U.S. Pat. No. 5,333,269 to Calvignac involved a mechanism for transferring messages between source and destination users through a shared memory. This patent involved a shared memory and control apparatus and provides data buffering and queuing of messages in transit between a sender and receiver. The messages are "chained" together to preserve their chronological order by small blocks of memory, each of which is associated with one buffer. The buffer control blocks also contain information about the buffer which they control. This system requires a control function that enqueues and dequeues messages in response to external requests. The present system described herein does not require the insertion of control information for messages, while additionally it also provides for notifying receivers of the presence of the message destined for the receiver.

The present Auxiliary Message Arbitrator System (AMA) provides a mechanism that allows a specific computer system to maintain a chronological ordering of messages that are being sent from a sending module to a receiving module. Usage is made of "tokens".

In the present system, a "token" is an 8-bit value that represents a physical slot (FIG. 1D) inside a message queue (dedicated to each module) which resides in the system memory 14. The available tokens reside in a Token RAM 58 (FIG. 1B) and each module is provided with up to 256 tokens which can indicate the 256 message slots for each dedicated message queue in the system memory 14 (FIG. 1D).

The present Auxiliary Message Arbitrator system allocates message queue slots to the senders and also notifies receivers which message in a queue is the next one to be examined.

In earlier systems, which used Unisys Corporation computer and network architecture, message passing was done between processors each of which had inbound message queues. Furthermore, these systems had "send-message" OP codes on their system busses and in their message address spaces. Messages were passed directly from sender to receiver with no memory queue accesses involved in the transfer.

The presently described network involves a platform which will simulate a personal computer PC-type of environment. The system has a system bus (System bus 10 in FIG. 2) coupled to a I/O bus 20 (PCI BUS, FIG. 2). In this type of environment, there is no arrangement for "send message operations" or message address space to be utilized. Further, in the "lowest levels" of the system network configuration, there will not be any hard Input/Output Modules (IOMs) or Central Processing Modules (CPMs). The IOM and the CPM processors will be implemented in P6 code. Other configurations will actually have hardware IOMs and/or CPMs.

Thus as an example in FIG. 2, the CPM2, (16), and IOM 3, (17) are software emulated modules while CPM 1, (12), and IOM 2, (28), are hardware modules. The hardware modules are custom built for the system and are designed with inbound message queues, except that the system requires that all modules handle message queuing and de-queuing the same way. The system bus 10 (P6 bus) and the PCI BUS (I/O bus 20) only have memory access types of commands and the messages will be sent by means of those commands. The Intel P6 processor boards will be modules which are off-the-shelf, so there cannot be any inbound message queue on these boards. Further, all of the modules in the network must follow the same message protocol so that in this situation, the hardware modules cannot take advantage of inbound message queues.

In the present system network, a protocol has been developed for passing messages with memory access commands through the common system memory 14. The memory locations, called "slots," that the messages are passed to, are represented by "tokens" which are 8-bit data values that indicate which particular slot may be used for a particular message queue. Each receiving module in the system has at least one message queue dedicated to it.

When a system module must send a message, it first gets a token from a Token RAM 58 and then uses the Token to calculate the system memory address of where the message is located in system memory 14. The sending module then fills in the message at the designated slot of the message queue in system memory 14 and returns the token to the Token RAM when the message has been passed. The receiving module then gets "interrupted" to inform it that a message is residing in its dedicated message queue at a specific slot. The receiving module then gets the token which points to the slot of the message queue where, in system memory, the message resides. The message in system memory is then read out by the receiver, the token is returned to the Token RAM 58 and this frees up that particular message passing slot in system memory 14.

This particular protocol is facilitated by the Auxiliary Message Arbitrator 30 (AMA). This unit maintains these tokens and executes the message access commands in addition to initiating hard and soft Interrupts for hard and soft modules. It also supports the system timers. Physically, the AMA 30 resides in a PCI bus expansion slot.

The present system is focused on a control method of insuring the chronological transmission of messages to and the satisfactory reception of messages by a receiving module from a sending module in a network having a mixture of hardware modules and software-emulated modules. Sequencing algorithms are utilized with a Token RAM and Control RAM together with two separate types (hard and soft) of Interrupt signals to notify a receiving destination module that a message is waiting in Main Memory to be retrieved by the receiving module.

SUMMARY OF THE INVENTION

A digital network supporting both hardware and software emulated digital modules provides for algorithmic sequences to insure the final completion of message transfers between sending and receiving modules whether they are hardware implemented or functioning as emulations in software.

An Auxiliary Message Arbitrator Unit (AMA) in a digital system network allows the system to maintain chronological ordering of messages that are being sent from a sending module to a receiving module. The Auxiliary Message Arbitrator allocates message queue slots in system memory to senders and then notifies receivers which message in a system memory queue slot is the next to be examined. The AMA module maintains a bit vector for each memory message queue where each bit space (cell) in the vector corresponds to one slot of main memory 14 in the message queue. One message queue is allocated in main memory for each unit in the system that can receive messages.

Each of the bit vectors is supplied with a set of 3 index pointers which operate with a Read pointer, a Write pointer and an Interrupt pointer.

The Read pointer operates such that if the bit value in the vector bit space (cell) noted by this pointer contains a "1", the pointer value will be returned when a receiver requests a "Read" index value. If the referenced entry in the vector bit space (cell) is "0", then this indicates that there are no active messages to be read.

The Write pointer operates such that it contains the index value of the "next message" slot of main memory 14 that is available for use by a sending module.

The Interrupt pointer operates to control interrupt generation. When a sending module indicates that a message has been placed in a given message slot in system memory, which is denoted by the "value" of this pointer, the AMA generates an Interrupt to the receiving unit which can then address the message slot and retrieve the message.

In addition to the pointers, each vector has a limit register (maximum length register) and an Interrupt address register. The limit register is settable to control the maximum number of message slots that can be accessed by a receiver before giving access to another receiver. The Interrupt register contains the memory address that the AMA will write-to in order to force a signal to the receiving unit to inform it that a message is waiting.

The Auxiliary Message Arbitrator Unit utilizes state machines on a Token RAM and Control RAM each of which supports a hardware interrupt queue for signaling interrupts to hardware modules and a software interrupt queue for signal interrupts to modules emulated in software.

BRIEF DESCRIPTION OF THE DRAWINGS

FIG. 1A is a block diagram of the Auxiliary Message Arbitrator Unit for controlling message transfers;

FIG. 8B is a flow chart showing the steps involved in a Get Message OP (operation).

DESCRIPTION OF PREFERRED EMBODIMENT

Figure 2:
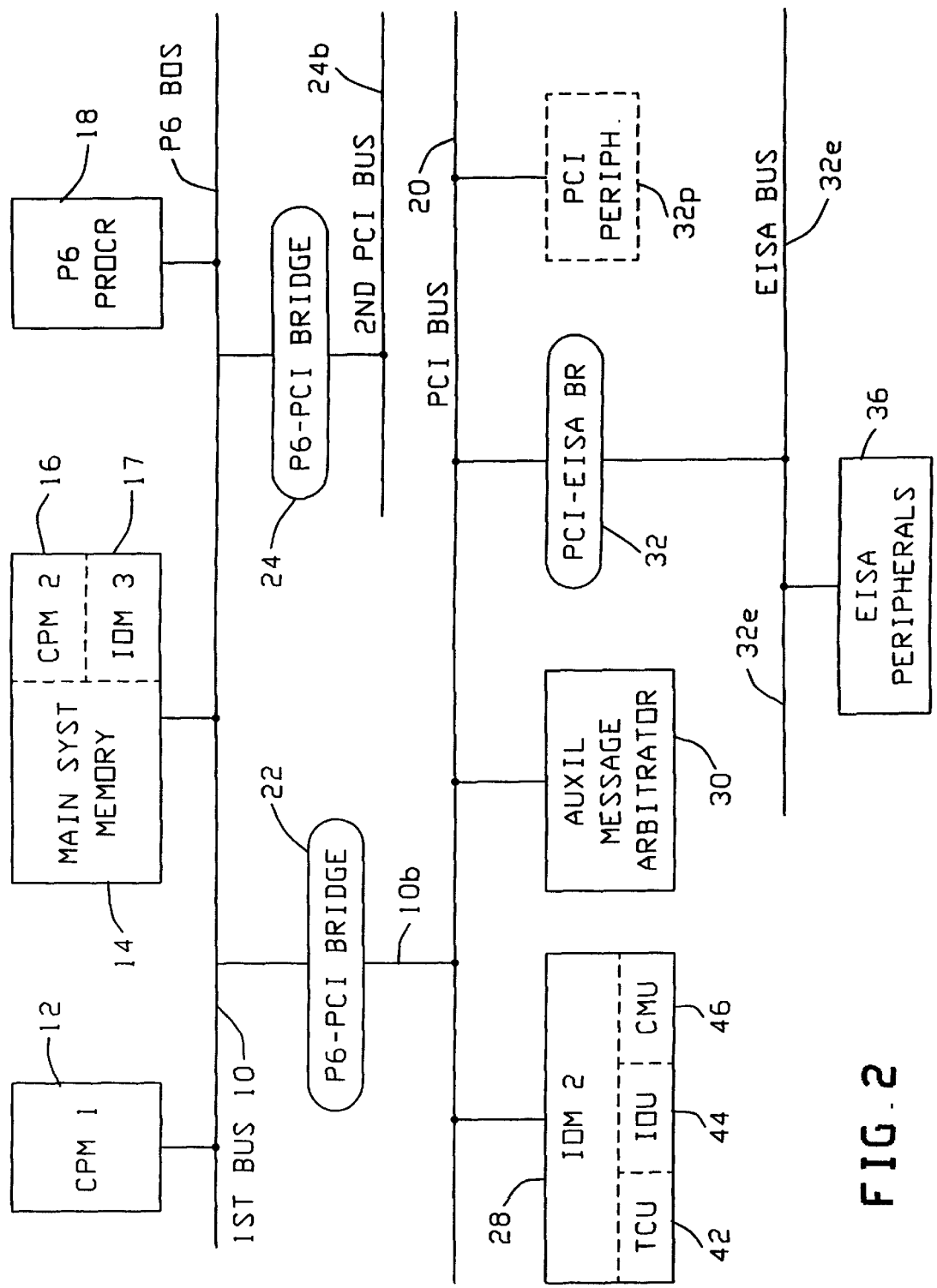
FIG. 2 is an overall drawing of the system network of digital modules wherein messages are passed between sending and receiving modules.

FIG. 2 illustrates a typical system network which uses the Auxiliary Message Arbitrator 30 (AMA) of the present system. Referring to FIG. 2, there is seen a system bus 10 (P6 bus) which connects a Unisys A Series Central Processing Module 12, a Main System Memory 14, an Intel P6 Software Implemented Processor 16, or other Intel P6 Processor 18. Additionally a software implemented Input/Output Module 17, IOM 3, resides in system memory 14.

Further connected to this system bus 10 is a first PCI-P6 bridge. This is designated as P6-PCI Bridge 22, which interconnects the system bus 10b over to the I/O bus 20 (PCI bus). The network may have a second P6-PCI Bridge 24 which connects to a second PCI bus (I/O bus) 24b, which may be used to enhance the network.

The PCI bus is an abbreviation for Peripheral Component Interconnect local bus. This involves a specification introduced by the Intel Corporation that defines a local bus system for a computer built to the PCI specification. The PCI local bus allows up to 10 PCI-compliant expansion cards to be installed in the computer. A PCI local bus system requires the presence of a PCI controller card, which must be installed in one of the PCI-compliant slots. Optionally, an expansion bus controller for the system's ISA, EISA, or Micro Channel Architecture slots can be installed as well, providing increased synchronization over all the system's bus-installed resources. The PCI controller can exchange data with the system's CPU with either 32 bits or 64 bits at a time, depending on the implementation, and it allows intelligent, PCI-compliant adapters to perform tasks concurrently with the CPU using a technique called bus mastering. The PCI specification allows for multiplexing, a technique that permits more than one electrical signal to be present on the bus at one time.

The I/O bus 20 (PCI bus) makes a common connection to a common scan engine 26, local Input/Output Module 28 (a hard IOM 2), a Bridge Unit PCI-EISA 32, which connects the I/O bus 20 over to an EISA bus 32e, and peripheral units designated 36. Additionally, residing on the I/O bus 20, is the Auxiliary Message Arbitrator 30 which regulates the passing of messages between sending and receiving modules.

Further seen in FIG. 2 is the bus 20 which connects the local Input/Output Module 28 to a series of Auxiliary Digital Modules designated as a Task Control Unit 42 (TCU), a remote Input/Output Unit 44 (IOU) and the Channel Manager Unit 46 (CMU). The EISA bus 32e is seen connected to the System Maintenance Controller 34 and various other peripherals 36.

The Auxiliary Message Arbitrator 30 is implemented on a single printed circuit board which resides on the system's I/O bus 20 (PCI bus). It functions to facilitate the system's message routing scheme and it also contains other system resources, such as high resolution hardware timers.

As seen in FIG. 1A, the Auxiliary Message Arbitrator 30 is provided with a PCI-Bus Interface Unit 52, a Timer Unit 54 and a Message Processing Unit 50. The Bus Interface Unit BIU 52 is also designated as a PCI Bus interface (I/F) Unit. The Auxiliary Message Arbitrator interfaces to the I/O bus 20 (PCI bus) by means of the Bus Interface Unit 52. The Bus Interface Unit 52 holds the PCI bus interface logic, a PCI configuration space, a target and initiator state machine, PCI parity logic, and interrupt address register, plus interfaces to the internal data path and the control bus, 51s.

The timer unit 54 contains a Time of Day (TOD) clock, a Maintenance Time of Day (MTOD) clock and a software timing mechanism.

The Message Processing Unit 50 contains logic necessary to control the execution function of the Auxiliary Message Arbitrator (AMA) operations. This includes control logic, the AMA's message routing functions and control of the timer functions. The Message Processing Unit 50 contains a token state machine, the Token RAM logic and Control RAM (CRAM) processing logic, a diagnostic register, a mode register, an interrupt response register, and message handling state machine, plus interfaces to the internal data path on the internal control bus.

Figure 1B:
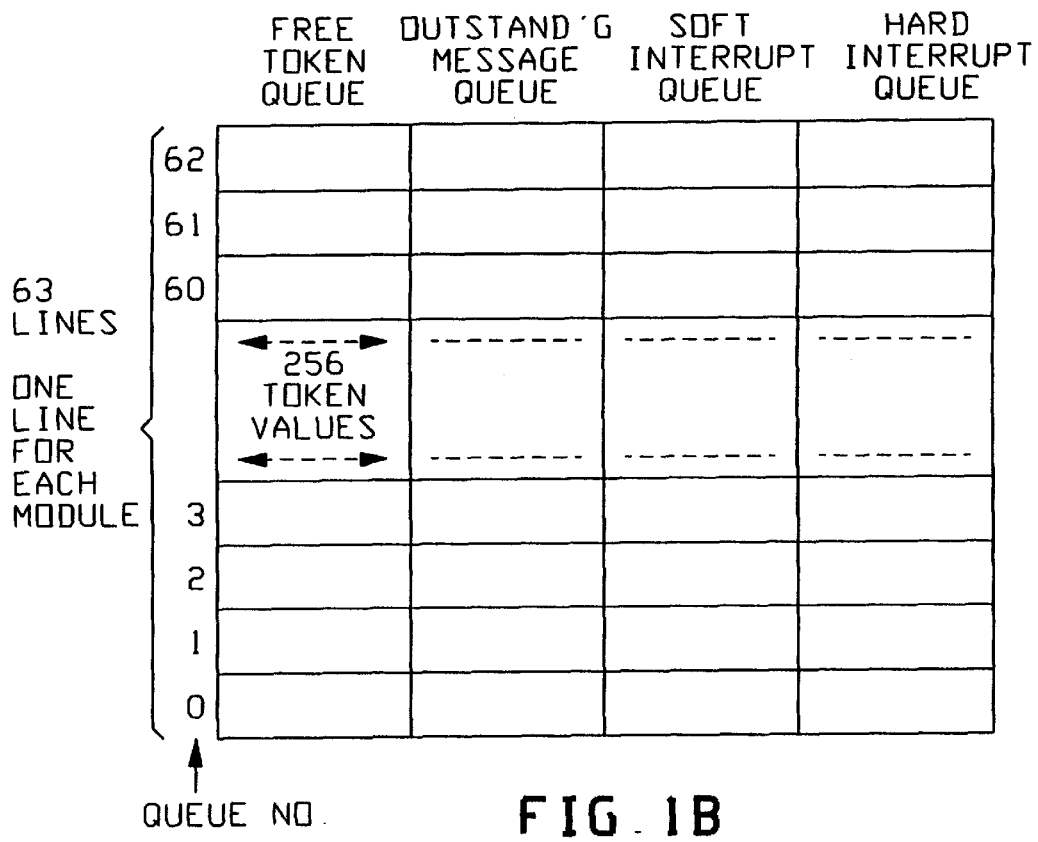
FIG. 1B is a drawing illustrating the Token RAM (TRAM)
Figure 1C:
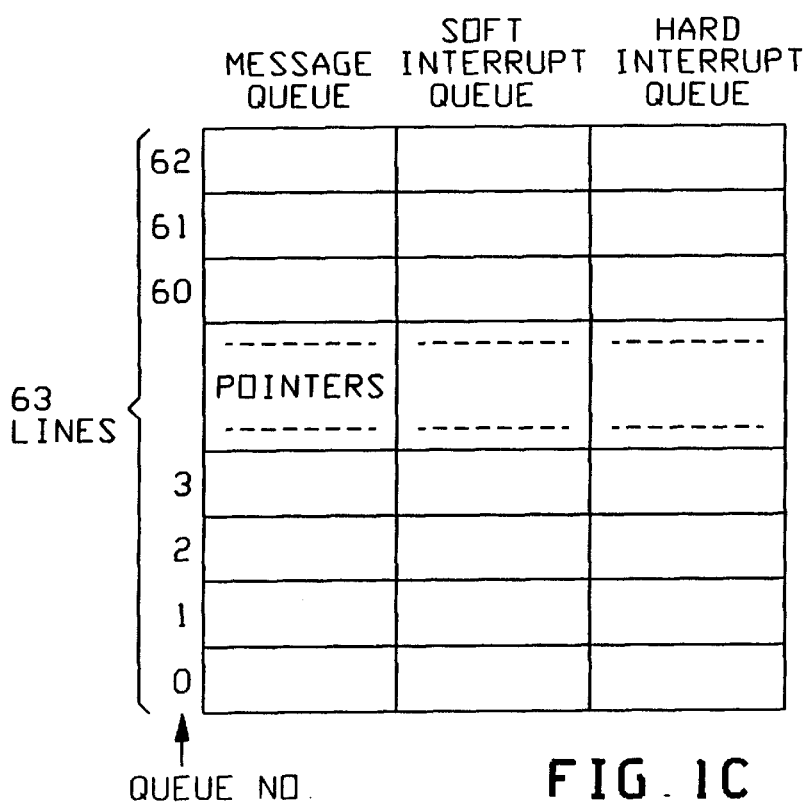
FIG. 1C is a drawing illustrating the layout of the Control RAM (CRAM)

The Token RAM (TRAM) layout is shown in FIG. 1B, and the Control RAM (CRAM) layout is shown in FIG. 1C. These RAMs are attached to the internal data path (51c, 51t) and controlled by logic in the Message Processor Unit, 50.

As seen in FIG. 1B, the TRAM 58 contains four types of queues. These include 63 lines of Free Token queues, each of which contains up to 256 token values. The next queue involves 63 lines of Outstanding Message Queues, each of which carries 256 token values in each one of the 63 Free token queues. Further, the TRAM has a soft interrupt queue which contains up to 63 lines of queue numbers and the final group involves the hard interrupt queue which contains up to 63 lines of queue numbers.

The Control RAM (CRAM 56) shown in schematic form in FIG. 1C, contains the queue state for 63 message queues, for the soft interrupt queue, and the hard interrupt queue.

The Auxiliary Message Arbitrator, AMA 30, of FIGS. 1 and 2 has a number of interfaces to other modules in the system.

The AMA internal bus 51, of FIG. 1A is a physical interface between the PCI-BIU 52 and the Message Processing Unit 50. This interface includes the operations control bus 51c and the internal datapath. The PCI-BIU 52 receives commands from the PCI bus 20. The PCI-BIU 52, in turn, passes these commands onto the Message Processing Unit 50 for execution. Depending on the type of operation, data may be passed on the internal datapath on either an 8-bit or a 32-bit data bus. This entire interface is synchronous to the 32 MHz board clock.

A number of signal lines are involved on the internal bus and these are summarized as follows:

(i) CMD_B:—This signal goes from the PCI-BIU 52 over to the Message Processing Unit 50 (MPU) to indicate the presence of a command that the message handler state machine (in the MPU 50) must execute. This signal goes active to initiate the command and stays active until the PCI-BIU 52 is finished with the operation.

(ii) WR_RDB:—This signal goes from the PCI-BIU 52 over to the Message Processing Unit 50 to indicate the direction of data transfer for a command that the message handler state machine must execute. When this is a logical "0", this signal indicates that the PCI-BIU 52 is now reading data from the internal data bus;

a logical "1" indicates a Write. This signal must be valid from the clock time that CMD_B is active, until the data is strobed across the bus by DATVAL_B.

(iii) OPCODE(3:4):—This is a 4-bit bus which goes from the PCI-BIU 52 over to the Message Processing Unit 50. It is taken directly from the low 16 bits of the PCI address. This bus must be valid from the clock time that CMD_B is active, until the data is strobed across the bus by DATVAL_B.

(iv) QNUM(7:8):—This 8-bit bus goes from the PCI-BIU 52 over to the Message Processing Unit 50. It is taken directly from the low 16 bits of the PCI address. It is the queue number of the selected operation, as will be seen on the "queue number bit map". This bus must be valid from the clock time that CMD_B is active until the data is strobed across the bus by DATVAL_B.

(v) DATVAL_B:—This signal goes in the other direction, that is from the Message Processing Unit 50 over to the PCI-BIU 52 in order to strobe the data across the 8-bit token data bus 51t or the 32-bit CRAM data bus 51c. The signal is strobed from one clock to signal that data has been transferred. This will not occur until the signal DTR_B is active.

(vi) DTR_B:—This signal goes from the PCI-BIU 52 over to the Message Processing Unit 50 to indicate that the PCI Bus Interface Unit is ready for a data transfer. The DATVAL signal will not be strobed until the signal DTR_B indicates that the PCI-BIU 52 is ready.

Figure 7:
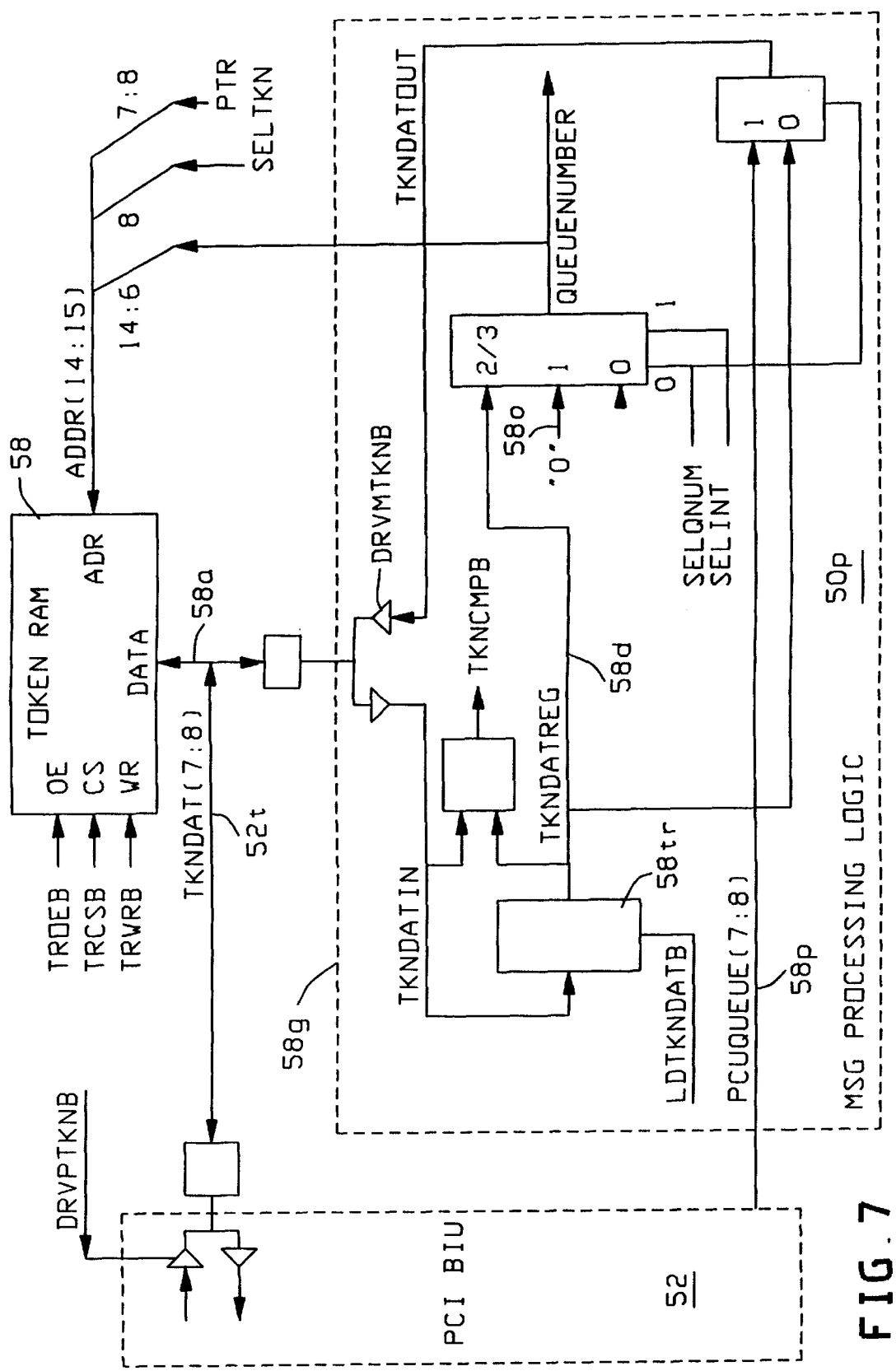
FIG. 7 is a diagram of the Token RAM (TRAM) datapath.

(vii) TKNDATA(7:8):—This involves the Token Data Bus 51t which is an 8-bit bidirectional data bus used by the PCI-BIU 52 in order to Write and Read tokens from and to the Message Processing Unit 50. It is also used by the Message Processing Unit 50 to load the interrupt response register for initiation of a PCI hard interrupt. It is also used for diagnostic accesses to and from the Token RAM 58 (TRAM 58). There are tri-state controls for this bus which are handled by the message handler state machine. Reference is also made to FIG. 7 indicating the TRAM datapath.

(viii) DRVPTKN_B:—This signal goes from the Message Processing Unit 50 to the PCI Bus Interface Unit 52 to cause the TKNDATA bus 51t to drive out from the PCI Bus Interface Unit 52 onto the TKNDATA bus. This signal is active "low" to cause the data to drive out.

(ix) CRDATA(31:32):—The CRAM data bus 51c is a 32-bit bi-directional data bus used by the PCI Bus Interface Unit 52 to Write and Read the CRAM 56 for diagnostic CRAM accesses. It is also used by the Message Processing Unit 50 to load the interrupt address register in 52 for the initiation of a PCI soft interrupt. Tri-state state controls for this bus are handled by the message handler state machine.

(x) DRVCRDAT_B:—This is a signal that goes from the Message Processing Unit 50 over to the PCI Bus Interface Unit 52 to cause the CRAM data bus 51c to drive out (from the PCI-BIU 52) onto the CRDATA bus on the CRAM data bus, mentioned above. This signal is active "low" to cause the data to drive out.

xi) BUSY_B:—This is a signal which goes from the Message Processing Unit 50 to the PCI Bus Interface Unit 52 to indicate that the message handler state machine in MPU 50 is busy and cannot accept an operation at this time.

(xii) WRSINT_B:—This is a signal which goes from the Message Processing Unit 50 to the PCI Bus Interface Unit 52 to load the interrupt address into the interrupt address register.

This signal goes active (low) for one clock time to load the register. The 36-bit interrupt address will be loaded across the CRDATA bus 51c. The low or high address will be loaded based on the value of SINTADR. This signal will not be asserted while the previous soft interrupt is still pending based on SINTPEND_B.

(xiii) SINTADR:—This signal goes from the Message Processing Unit 50 over to the PCI Bus Interface Unit 52 to indicate, during a load, the interrupt address, whether the high or the low address portion is to be written a "0" which selects the low portion (ADR (31:32)). A "1" selects the high portion (ADR(35:4)). This signal must be valid during the clock time that WRSINT_B is active.

PCI Bus (I/O Bus 20) Operations: The Auxiliary Message Arbitrator 30 supports a 32-bit data bus at a clock speed of 33 MHz. The AMA contains functionality for both being an initiator and a target. Hard interrupts are generated on the PCI INTA line. Side band signals may be utilized for such things as a 2.4 microsecond clock distribution. The Auxiliary Message Arbitrator contains a single device's configuration space and also an internal 64K memory address space.

Figure 3:
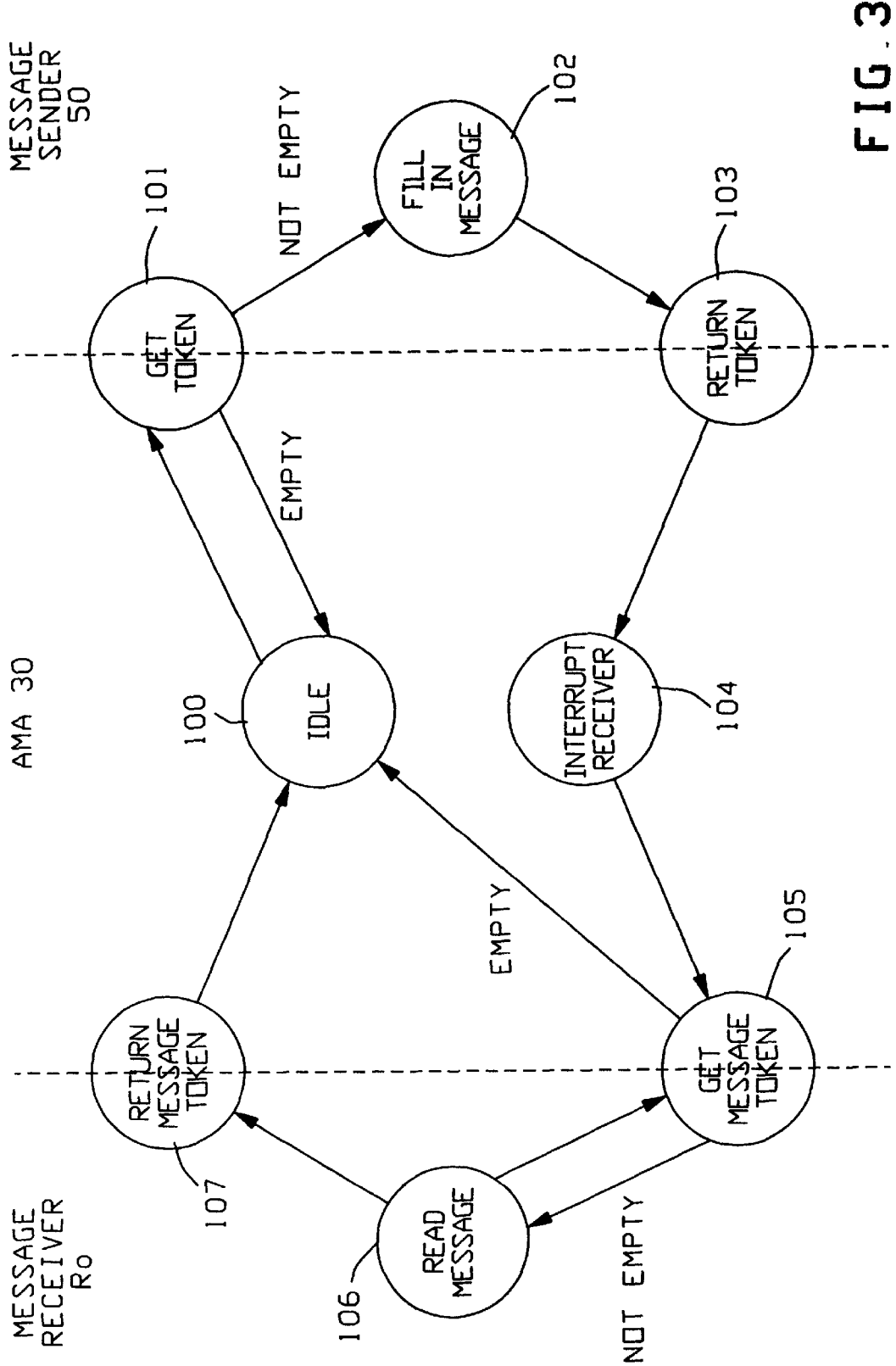
FIG. 3 is a drawing illustrating the message passing protocol.

Message Passing Protocol: Referring to FIG. 3, there is seen a diagram of the message passing protocol. The Message Processing Unit 50 handles the message routing functions of the Auxiliary Message Arbitrator. When one system module needs to send a system message to another module, this is accomplished through an allocation of a system memory block in system memory 14 which is used to pass the message data from the sender to the receiver. After allocation of the system memory block, this is followed by an interrupt to the receiving module after the message is filled into the system memory block. Multiple messages can back up and be ready to be sent to one Message Receiver. The Message Receiver must receive these messages "in the order" that they were sent to the receiver. The order is determined at the time of the return token command. The AMA Message Processor facilitates the network message processing protocol.

Each receiver of a message has at least one message queue number assigned to it. However, it may have more than one queue number. Each Message Sender must know the queue number for all message destinations that it needs to send to. When the sender needs to send a message, the following protocol is observed in order to get a message all the way over to a Message Receiver.

Referring to FIG. 3, starting at the idle state 100, if a sender must send a message, it must first be ware of the queue number of the receiving module. The sender then executes a "get token" operation at 101 from he Auxiliary Message Arbitrator 30. The Auxiliary Message Arbitrator returns a token, which token is used by Sender to calculate a system memory address for the location to write the message into.

In FIG. 3 the dotted lines illustrate the involvement that the Message Receiver, "Ro", the Auxiliary Message Arbitrator 30, and the Message Sender have in this data transfer process. In the first case where the sender executes a "get token" operation at 101, the sender So and the AMA 30 are involved.

If the queue "empty" condition occurs on the "Get Token" command, the Message Sender "So" cannot calculate an address, because one has not been allocated. Normally, this should never occur and would probably involve a system error. However, if the number of queue slots utilized actually became more than 256, this could occur. By looping on "Get Token" commands until a command was obtained, the protocol would remain intact.

The next operation involves the sender writing the message data into main system memory 14 at the calculated system memory address (102). The sender So, then executes a return token (103) operation to the AMA indicating that the message is in the location specified. The AMA then executes an interrupt to the receiving module at position 104. This interrupt could be a hard interrupt or a soft interrupt (program code).

The receiver, "Ro" upon receiving the interrupt at 104, executes a "Get Message" operation at 105 from the AMA which involves getting a message token. If the interrupt was a hard interrupt, then a read interrupt response register command must be executed first. If not, then this step is skipped. The AMA supplies the token, which along with the queue number, points to the system memory address in which the message is stored. The receiver at 106 then reads the message out of system memory 14.

After the message is read, the receiver "Ro" returns the "message token" back to the AMA at 107 with a "Return Message Token" OP, i.e., a Write operation to the AMA. This tells the AMA 30 that the receiver Ro can now receive another interrupt if one is pending.

The description above was an example of a simple one-sender, one-receiver transmission. In actuality, in the system, many senders will be sending to many receivers.

The Auxiliary Message Arbitrator has been designed to concurrently handle 63 lines of queue numbers. Each queue that is handled deals with 256 token values that may be in one of four states. These states are: (i) free and ready to pass out on Read token operations; (ii) allocated to a sender for filling in the message data; (iii) ready to send message data out to a receiver; or (iv) actually gone out to a receiver who is getting the message data.

After a "Return Token" operation 103 (FIG. 3) occurs, and then after the token is ready to be sent to a receiver, an interrupt must be sent. The pending "interrupt" may be in one of the following locations: (i) awaiting its turn in the receiver's Outstanding Message Queue TRAM FIG. 1B; (ii) sitting in the soft message queue, FIG. 1B, waiting to be sent over the PCI-BIU (Bus Interface Unit) 52 of FIG. 1A; (iii) sitting in the hard message queue waiting to be sent to the interrupt response register in the MPU 50 (FIG. 1A); (iv) in the interrupt address register (BIU 52) next to go out as a soft (memory mapped) interrupt; (v) in the hard interrupt response register in MPU 50 next to go out as a hard interrupt using the INTA line on the PCI bus (I/O Bus 20); (vi) or actually out on the bus 20 (hard or soft, execution of the interrupt).

An optional protocol may also be implemented for "fast queue" emptying. After an interrupt operation, the successive "Get Message Token" operations (105, FIG. 3) may be executed by the Message Receiver until the "empty" flag is set. In this way, the queue may be emptied with only a single interrupt. This also skips the interrupt response register read on "soft interrupts". To the Auxiliary Message Arbitrator AMA, a second "Get Message Token" operation will imply a "Return Message Token" with no interrupt being set and then a "Get Message Token" operation.

No interrupt will be queued for this skipped "Return Message Token" operation. The Message Receiver can either get message tokens until the queue is empty or else stop when it wants before the queue is empty. When the queue shows "empty", there is no token available and a return message token must not be sent. As long as the queue (TRAM Outstanding Message Queue FIG. 1B) was not empty, the cycle can be terminated with a "Return Message token". The message data must be read out from system memory 14 before getting the next token with a "Get Message Token" operation (105).

Token and Message Operations: The token and message operations involve the reading or writing of a token. A "token" is an 8-bit value that represents a physical slot inside a message queue which resides in system memory 14. The token is aligned within the data word such that it can be used as a physical offset from the base of a queue. The message queues have 256 slots and each slot holds 4 EMODE words typical of Unisys A Series Computers. Since the system EMODE word is mapped into 8 evenly aligned Intel bytes, then each queue slot takes up to 32 Intel bytes. The token value can be added to the Intel byte address of the base of the queue to get the base of the queue slot. The token word is mapped as shown below in Table 11 and in Table 12.

TABLE 11

TOKEN DATA BIT MAP

| WORD[30] | WORD[30] | WORD[29] | WORD[28:16] | WORD[12:8] | WORD[4:5] |
|---|---|---|---|---|---|
| Exception | 0 | Empty Queue | 0 | TOKEN[7:8] | 0 |

The "exception" bit will be set if the "empty queue" bit is active. Both bits are active "high" to indicate that the condition exists. An "empty queue" condition (Table 11) indicates that the token value is invalid and that there was no token available for the operation. This may or may not be an error. For a "Get Message Token" and in the fast queue empty protocol, this would indicate that the queue was emptied, which would be a normal finish to de-queuing all the messages; however in response to an "interrupt," this would be an error. In a "Get Token" operation 101, FIG. 3, it would indicate that all the tokens were outstanding (in use) or that the queue was initialized as unused. Only the "token" field is writable, the other bits come from hardware. The token field is designated TOKEN [7:8]. (Table 12)

Based on whether the access is a Read operation or a Write operation, this "token" operation is either a "Get Token" 101 or a "Return Token" 103 operation. A "Get Token" 101 operation (Read) gets the next available free token for a specified queue number. The next available token is returned to the requestor and then de-allocated from the free token queue in TRAM 58, FIG. 1B.

A "Return Token" 103 (FIG. 3) operation (Write) causes that token to be inserted into the end of the Outstanding Message Queue of TRAM 58 with a selected queue number. If the Outstanding Message Queue is empty for that queue number, meaning that there is not an interrupt presently being executed or queued, then an interrupt is initiated to the module (Message Receiver) who empties this queue number. This is because, if the message queue was empty on a return token, then there is no outstanding interrupt and none needs to be generated.

Based on whether the access is a Read or a Write, this "message operation" is either a "Get Message" or a "Return Message". A "Get Message Token (105, FIG. 3)" operation "Read" gets the token number at the top of the Outstanding Message Queue for the specified queue number. This token is returned to the requestor and then de-allocated from the Outstanding Message Queue in TRAM 58, FIG. 1B. A second "Get Message" operation in a row from one queue number indicates the fast message de-queuing case which causes an "implied return message", but does not involve an interrupt.

A "Return Message Token" operation 107 4(FIG. 3) (Write) causes that token to be inserted onto the end of the free token queue in TRAM 58, FIG. 1B, for the selected queue number. If the Outstanding Message Queue was not empty for that queue number, then another interrupt is initiated so that the Message Receiver can get the next message.

Diagnostic RAM Access Operations: The "TRAM Access" (Table 12) operation allows diagnostic access to the TRAM 58, FIG. 1B. This token RAM is written to or read from based on whether the PCI bus interface 52 is a memory Write or Read. The TRAM address will be taken from the diagnostic register (in MPU 50) for this operation. The TRAM 58 of FIG. 1A and 1B must be initialized before the AMA can properly execute message processing operations. A bit map of token data diagnostic access is shown in TABLE 12, designated "TRAM DIAGNOSTIC ACCESS BIT MAP". Here, only the token portion is writable.

TABLE 12

TRAM DIAGNOSTIC ACCESS BIT MAP

| WORD[31:19] | WORD[12:8] | WORD[4:5] |
|---|---|---|
| 0 | TOKEN[7:8] | 0 |

The "CRAM access" operation allows diagnostic access to the Control RAM (CRAM) FIG. 1C. This Control RAM is written-to or read-from based on whether the PCI bus interface 52 involves a memory Write or a Read. The RAM address will be taken from the diagnostic register (in MPU 50) for this operation. It will be noted that this Control RAM (CRAM) 56 must be initialized before the Auxiliary Message Arbitrator 30 can properly execute message processing operations. All queue numbers need to be initialized and unused queue numbers will be initialized as "empty". Table 13 is a bit map for diagnostic access of the Control RAM.

TABLE 13

CRAM DIAGNOSTIC ACCESS BIT MAP

| WORD[31:32] |
|---|
| RAMDATA[31:32] |

Timer Access Operations: A 36-bit Time of Day (TOD) clock in module 54, FIG. 1A can be Written to or Read from. This is implemented as an up-counter. Both Reads and Writes must be accessed in one single PCI Bus 20 (I/O Bus 20) cycle, or the timer could have incremented between accesses which would cause invalid data to be accessed. If a split access occurs on a Write, the invalid bit will be set in the counter. If a split cycle occurs on a "Read", the "Invalid" bit will be set in the Read data, but not in the actual counter.

To get a valid "Write", Write/Read cycles could be performed until the Read data has the invalid bit reset. The occurrence of this split cycle would normally be a rare occurrence. Optionally, the "invalid" bit could be handled as a system error.

The TOD counter in module 54 is never disabled from counting. It counts in 2.4 microsecond increments. The value of the Time of Day (TOD) data read out will be the number of 2.4 microsecond intervals that occurred since being loaded, in addition to the value loaded. The Time of Day clock bit map is indicated below in Table 14 where the TAG is set to "0" and only the TOD portion of the timer is writable.

TABLE 14

TOD ACCESS BIT MAP

| WORD[63:12] | WORD[51:4] | WORD[36] | WORD[36] | WORD[35:4] | WORD[31:32] |
|---|---|---|---|---|---|
| 0 | TAG0 | 0 | INVALID | TOD[35:4] | TOD[31:32] |

The 36-bit Machine Time of Day (MTOD) clock can also be written-to or read-from. Its counter is disabled from counting when the MTOD_STOP bit is set in the AMA mode register in MPU 50. It also counts 2.4 microsecond increments. The value of the MTOD data read will be the number of 2.4 microsecond intervals that occurred while the timer was enabled, since the counter was loaded in addition to the value that was loaded. The Machine Time of Day (MTOD) timer bit map is indicated below in TABLE 15. Only the MTOD portion of the timer is Writable.

TABLE 15

MTOD ACCESS BIT MAP

| WORD[63:12] | WORD[51:4] | WORD[47:11] | WORD[36] | WORD[35:4] | WORD[31:32] |
|---|---|---|---|---|---|
| 0 | TAG | 0 | INVALID | MTOD[35:4] | MTOD[31:32] |

A 16-bit software timer in the timer module 54, FIG. 1A, can be Written-to or Read-from. It counts down once each of 2.4 microsecond clocks. When it counts down to "0", a hard interrupt is generated. The Pentium Processor P6, in response to the hard interrupt, must execute a "Read Interrupt Response Register" read in MPU 50. Once the timer counts down to "0", it stops there until reloaded with a non-zero value. Single or double word accesses are both possible and the upper word will always be ignored within the AMA. The soft timer bit map is indicated in TABLE 16 below.

TABLE 16

SOFTWARE TIMER OPERATION BIT MAP

| WORDS[31:16] | WORD[13:16] |
|---|---|
| OPEN | TMR[15:16] |

Interrupt Response Register (FIG. 1A. in MPU 50):

The "Read Interrupt Response" operation is executed in response to a hardware interrupt generated by the 15 Auxiliary Message Arbitrator. The AMA sets INTA_B active on the PCI Bus 20 to initiate a hard interrupt. The interrupt remains active on the PCI bus 20 until the interrupt response register is read. The AMA activates a hard interrupt for two possible reasons: (1) a message interrupt is de-queued from the hard interrupt queue by the message handler state machine, in which case the MSG_INT_FLG (TABLE 17) flag will be set; (2) the soft timer expires, in which case the TIMER_INT_FLG (TABLE 17) will be set. In either case when the Pentium P6 Processor reads the AMA's interrupt response, the data read will indicate if either or both interrupt reasons exist.

If the low bit of the OP Code (OPCODE [0]) is set to "1", the MSG_VLD bit will be cleared in the interrupt response register, and the interrupt will be reset on the PCI Bus 20. If the next bit of the OP Code (OPCODE [1]) is set to "1", the TMR_VLD bit will be cleared in the interrupt response register, and the interrupt will be reset on the PCI Bus 20. If neither bit is set, the data will be Read, but the flags will not be reset and the interrupt will not be reset.

In the situation of a message interrupt (Read Interrupt), the queue number associated with the interrupt is presented in the data shown on the following TABLE 17. The software timer expiration will automatically cause an interrupt to be generated if one is not pending, or if one is pending, the TMR_INT_FLG bit will be set on the Read response. A message interrupt and a timer interrupt can be communicated with a single, hard interrupt cycle.

TABLE 17

READ INTERRUPT RESPONSE OPERATION BIT MAP

| WORD[31:21] | WORD[10] | WORD[9] | WORD[8] | WORD[7:8] |
|---|---|---|---|---|
| 0 | HIPEND | TIMER INT FLG | MSG INT FLG | QUEUENO[7:8] |

Diagnostic Register (MPU 50: (FIG. 1A):

The "diagnostic register" operation allows access to the diagnostic register of the AMA (Message Processing Unit (FIG. 1A). This register is written-to or read-from based on whether the PCI Bus 20 operation is a memory Read or a Write. Control at diagnostic operations is done by the P6 processor 18, FIG. 2. The mapping of the diagnostic register is shown in TABLE 18 below. The diagnostic RAM address field is used in conjunction with the diagnostic RAM access operations. This field will source the RAM address for the "TRAM Access" operation or for the "CRAM Access" operation. The "CRAM error" and the "TRAM error" bits indicate that the specified RAM sustained a parity error. The "SM error" is a state machine detected error which could be caused by a variety of reasons, such as (i) an AMA message operation was attempted, while that operation was locked out; (ii) an invalid OP Code was executed; (iii) a return message token mis-compare error occurred; or (iv) a "Get Message" on an empty queue occurred. Only the bottom 20 bits are writable. An error is cleared by writing it to "0".

TABLE 18

DIAGNOSTIC REGISTER BIT MAP

| Field Location | WR/RD | Field Name | Definition |
| --- | --- | --- | --- |
| Data[31] | R | Exception | Indicates an error is active |
| Data[30] | R | 1 | Set to '1' to identify this register |
| Data[29:10] | R | 0 (unused) | Set to '0' |
| Data[19] | W/R | SM Error | Ama State Machine Detected Error |
| Data[18] | W/R | CRAM Error | CRAM Parity Error |
| Data[17] | W/R | TRAM Error | TRAM Parity Error |
| Data[16:17] | W/R | Diagnostic Address | RAM address for diagnostic RAM accesses |

Mode Register:

[In message Processing Unit 50, FIG. 1A] The AMA mode register operation allows access to the mode register of MPU 50 of the AMA. This register is written-to or read-from based on whether the PCI bus operation on bus 20 is a memory Read or a memory Write. The mapping of the mode register is shown below in TABLE 19. The MTOD STOP bit prevents the Machine Time-of-Day counter from counting. The "RAM access enable" bit enables the diagnostic RAM accesses. If this bit is not set, then diagnostic RAM Writes will be ignored. Diagnostic RAM Reads will be still be executed. The interrupt enable bit enables the processing of two interrupt queues. The AMA "run bit" enables token access and message access operations. If not set, the AMA will set "SMERR" (State Machine Error) in response to these operations designating this as a state machine error condition.

TABLE 19

AMA MODE REGISTER BIT MAP

| Field Location | Field Name | Definition |
| --- | --- | --- |
| Data[31:28] | 0 (Unused) | 0-Reserved |
| Data[3] | AMA RUN | 1=Enables token & message operations |
| Data[2] | Interrupt enable | 1=Enables interrupt queue processing |
| Data[1] | RAM Access Enable | 1=Enables diagnostic RAM writes |
| Data[0] | MTOD STOP | 1=Stops the MTOD timer from counting |

The present system provides a mechanism which allows the network to maintain chronological ordering of messages that are being sent from a sending module to a receiving module. The Auxiliary Message Arbitrator (AMA) 30 of FIG. 1A allocates message queue slots in system memory to senders and then notifies the receivers which message in the message queue is next to be examined.

The Auxiliary Message Arbitrator 30 maintains a "bit vector" for each memory message queue (EMODE) in system memory 14. Here, each bit in the vector corresponds to one slot in the message queue. One message queue is allocated for each unit module in the system that can receive messages, and thus since there are 63 slots for message queues, there can be 63 potential receiving modules.

Figure 4:
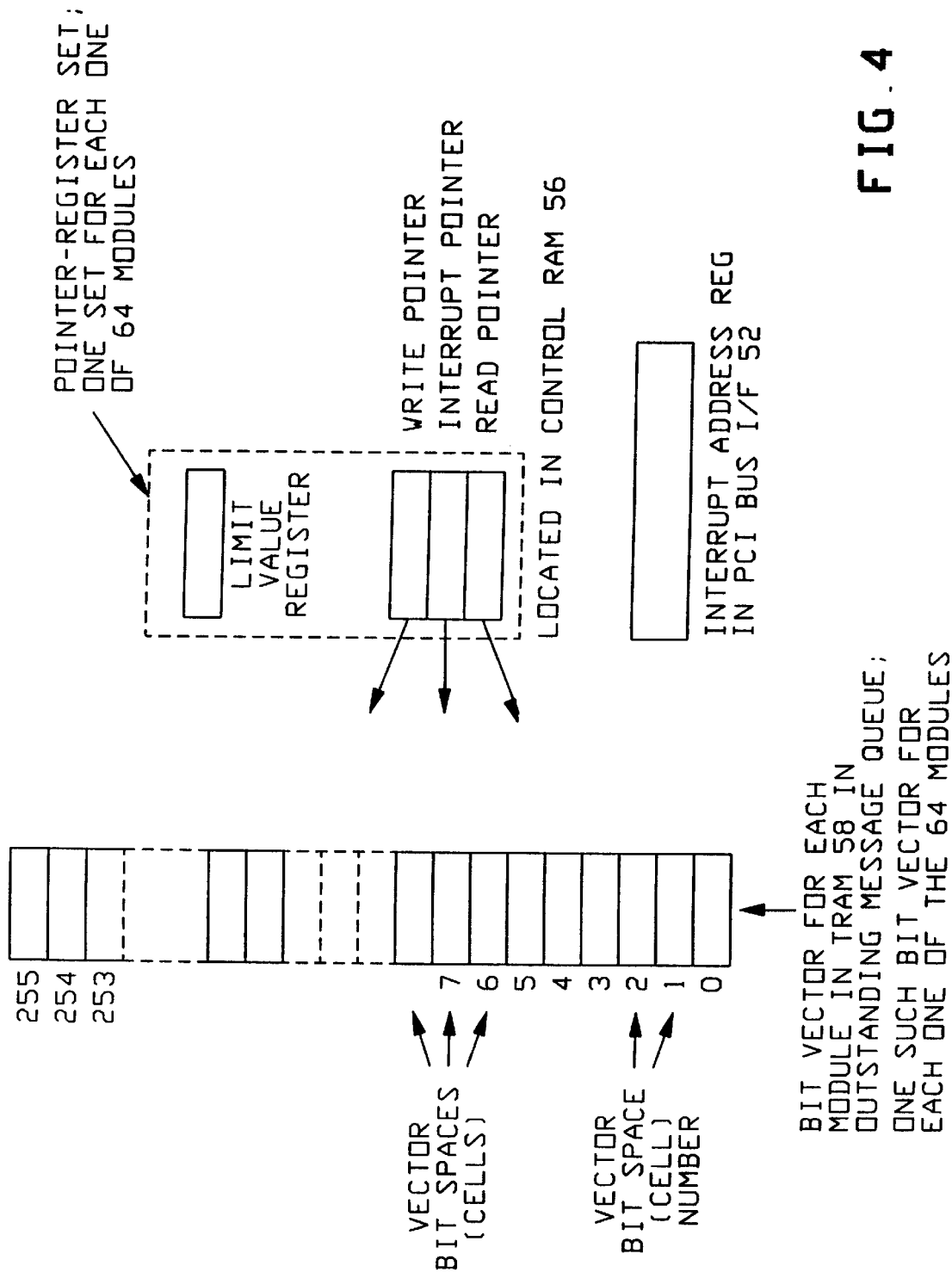
FIG. 4 is a schematic drawing showing a typical bit vector and its associated registers.

Referring to FIG. 4, there is a bit vector for each module in the network and each "bit vector" has three index pointers associated with it. Thus, each bit vector has a Write pointer, a Read pointer, and an Interrupt pointer.

Referring to FIG. 4, the bit vector for each module is seen to have 256 bit spaces where each bit space can hold a "1" or a "0."

Each one of the 256 bit spaces of the bit vector are given a number as 0, 1, 2 . . . 254, 255. These bit spaces reside in the TRAM 58 (FIG. 1B) in the Outstanding Message Queue.

The various pointers in the bit vector of FIG. 4 have specialized functions. The Read pointer functions so that if the bit space in the vector denoted by this Read pointer contains a "1", the pointer value will be returned when a receiver requests a Read index value. If the referenced entry in the bit space vector is "0", then there are no active messages to be read.

The Write pointer contains the index value of the next message slot that is available for use by a sending module.

The Interrupt pointer controls interrupt generation, such that when a sending module indicates that a message has been placed in the queue message slot of system memory and this is denoted by a "1" value in this pointer bit space vector, then the AMA generates an "interrupt" to the receiving unit.

Each bit vector seen in FIG. 4 also has a "maximum length" register (limit register) and also an "interrupt address" register. The maximum length register is settable to control the number of messages which can be accumulated. The Interrupt address register in BIU 52 contains the memory address in Main Memory 14 that the AMA will Write-to in order to force a signal to a receiving unit to let it know it has a message.

It is to be noted that FIG. 4 merely depicts one AMA bit vector having 256 bit spaces and its associated pointer registers which is applicable to one module. Each module in the system will have its own special bit vector and pointers.

Operations:

When a sending module is prepared to send the message to a receiving unit, the sending module calls the Auxiliary Message Arbitrator 30 using a memory-mapped Read. The low order of bits of the Read address denote the particular bit vector to be used. The bit vector was shown in FIG. 4 as an example of one bit vector. Each bit vector and pointer group is allocated to each possible receiving unit. The AMA 30 completes the Read by returning the bit number of the next available bit space in the bit vector and thereafter completes the Read by returning the next available slot (token) in the corresponding message queue in system memory 14.

It should be seen that this is an "atomic" operation, so that sending modules that make "simultaneous requests" will then be "ordered" by their priority in obtaining the system memory bus 10 (FIG. 2). If all the bit spaces in the vector of FIG. 4 are set to "1", this indicates the message queue for that module is full. In this case, the AMA returns a value of "0" and thus the sender must wait some undefined, but short period of time, and then "retry" the operation.

When the sending module has received the number ("token") of the slot in main memory 14 for it to use, then the sending module places the message in the corresponding slot in the receiving unit's main memory message queue located in main memory 14.

The platform-relative storage address is:

=e_mode_base_addr+8*

(RECEIVER_QUEUE_WORD_ADDR+4*token_VALUE)

where+=ADD; where *=MULTIPLY.

The e_mode_base_addr is the platform-relative address of the "beginning" of the EMODE memory. The RECEIVER_QUEUE_WORD_ADDR is the EMODE word address of the zero'th slot in the receiver's message queue.

It is to be noted that the slot "zero" is not used and the token number value will always be between one and the number of entries in the queue.

When the sending module has placed a message in the appropriate slot in the main memory message queue of the destination receiving module, it calls the AMA 30 using a memory-mapped Write operation. The lower order bits of the address once again denote the "bit vector" to be used (FIG. 4), and the data that is written is the token number value originally obtained in the first part of the operation. The AMA 30 sets the bit space value in the vector that corresponds to the token number value, and this indicates that the message is ready to be sent to the receiving unit when the receiving unit is available.

The Auxiliary Message Arbitrator (AMA) maintains a pointer (FIG. 4) for each bit vector and this denotes the last message that was signaled to the receiving unit which corresponds to that bit vector. This pointer is the Interrupt pointer which is seen in FIG. 1C and FIG. 4. If the token number that is being written-to the Auxiliary Message Arbitrator 30 is placed in the slot that is denoted by the Interrupt pointer, the AMA sends an Interrupt signal to the receiving module and "advances" the Interrupt pointer.

If no interrupt signal is sent to the receiving module, the AMA 30 does nothing, which indicates that another sender, "ahead" of the current sender, has a request outstanding. When that prior sender (there could be more than one) completes its operation, the AMA will send one Interrupt for each message that has been completed, that is to say, a message that is placed in memory 14 and the Write operation of the token number has gone back to the AMA in TRAM 58 in column 1, of FIG. 1B.

When the receiver gets the Interrupt signal, it executes a memory-mapped Read to the AMA. The low order bits of the address denote the unit number. The AMA returns a token number denoting the next message index to the receiver.

When the receiver is finished with the message or has copied it out of the message queue in memory 14, it executes a memory-mapped Write to the AMA, sending back the token number value as Write data. The AMA resets the bit corresponding to the token number value, indicating that this locational spot is now available and advances the next message pointer.

There is another bit in the memory-mapped address space of the AMA 30 which distinguishes between sending modules and receiving modules.

As an example of operations in this system, if it is assumed that there are three units in the system network, that is to say, two Sending units S1 and S2 and one Receiving unit R1. The bit vector (FIG. 4) associated with receiver R1 starts off with all bit spaces at "0" and with all of the pointers set to "1". The following sequence will illustrate how the messages are kept in chronological order.

(a) When the first sender S1 requests a token number (from TRAM 58, column 1 of FIG. 1B) by executing a memory-mapped Read, the AMA 30 returns the value "2" and then advances the Write pointer to "2".

(b) Then sender S2 requests a token number. Here, the AMA 30 returns the value "2" and advances the Write pointer (FIG. 4) to "3".

(c) The sender S2 copies its message into system memory slot number 2 in the receiver (R1) module's message queue in main memory 14. Sender then executes a memory-mapped Write to the AMA 30 passing the value "2" as the Write data. The AMA sets bit space in the vector. Since the Interrupt pointer contains the value "1", then no Interrupt is sent to the receiver.

(d) The first sender S1 copies its message into slot number 1 in the receiver module's message queue in system memory 14, that is to say, S1 executes a memory-mapped Write to the AMA 30 passing the value "1" as Write data. The AMA sets bit 1 and, because the Interrupt pointer contains the value "1", it generates an Interrupt (which is a memory-mapped Write) to the receiving module R1. It also advances the Interrupt pointer to "2". Since the bit value in slot number 2 is set (=1), the AMA 30 generates another Interrupt to receiver R1.

(e) The receiving unit R1 gets this Interrupt and then requests the message token number. The AMA 30 returns the value "1," sets bit space (first bit) to a value of "0", and advances the Read pointer to "2".

(f) The receiving unit R1 requests another message token number. The AMA returns the value "2" and advances the Read pointer to "3". If the receiving unit R1 requests another token, the AMA 30 will return the value "zero" since the Read pointer denotes a bit vector space in the bit vector whose value is "0" (i.e., no message). If the first sender S1 completes its Read-Copy-Write sequence before sender S2 requests a token number, then AMA 30 will generate an Interrupt as soon as it receives the Write command.

The following illustrative examples will refer in FIG. 2 to the hard CPM 1(12), the soft CPM 2(16) and the Input/Output Module 17, designated IOM 3. Reference is also made to the bit vector of FIG. 4 in addition to the Read, Write and Interrupt pointers of FIG. 4.

In all these cases when a pointer is advanced, a value of 1 is added to the pointer. Also, the new pointer value is compared with the limit value. If the pointer value is greater than the limit value, the pointer is set to a value of "1". Thus, by pre-setting the limit value, then the amount of time devoted to searching for messages to a particular receiving module and transmitting these messages to that particular receiving module is limited to the particular number of messages set in the limit value register, FIG. 4.

The new pointer value (which is the old value plus 1, or just the value of "1") is stored back into the pointer storage location.

The first illustration using steps A1–A10, will involve the situation where the CPM 1(14) sends a message to the IOM 3(17). Now, assuming the initial conditions such that in FIG. 4, the Read pointer, the Write pointer, and the Interrupt pointer all have the value of "1", and the bit vector has all "0s" in its bit spaces (cells). Further, in main memory 14, the space 17 has been allocated for the IOM 3. All modules have the main system memory addresses of the message storage area for each module that they will communicate with, and they have their own main memory message storage area address. Thus, the following sequence of operations will occur:

A1. CPM 1 issues a Read operation, referencing the AMA 30 on the PCI bus 20. The low order bits of the address will designate this as a "Get Token" command and will specify IOM 3 as the destination module.

A2. The AMA 30 completes the Read operation by returning the value of the Write pointer (=1) and advances the Write pointer by "1" so that the new value is equal to 2. The returned value is called the "Token".

A3. The CPM 1 copies its message into the main memory space allocated for IOM 3, using slot 1 in that space as designated by the Token value. (See FIG. 1D).

A4. The CPM 1 issues a Write operation to the AMA 30. The low order bits of the address designate this as a Return Token command and specifies the module IOM 3. The Write data contains a "1". (The Token value from step A2).

A5. The AMA 30 sets bit space number 1 in FIG. 4 (which is the Token value from step A4), such that the bit 1 will have a bit vector reading equal to "1". Since the Token value (1) is equal to the Interrupt pointer value, the AMA control logic signals the Interrupt logic in the PCI interface 52 to interrupt the IOM 3. The AMA 30 advances the Interrupt pointer by "1" (so that the new value equals "2").

A6. The IOM 3 receives the Interrupt signal and issues a Read operation referencing the AMA 30 on the PCI bus 20. The low order bits of the address denote this operation as a "Get Message" command and specify the module IOM 3.

A7. The AMA 30 completes the Read operation by returning the value of the Read pointer (=1). The AMA sets bit space number 1 (FIG. 4) in that bit vector to equal "0", and then advances the Read pointer by "1", so that its new value is now equal to "2". The returned value is again a Token.

A8. The IOM 3 copies the message from main memory 14, using a slot 1 of that space as designated by the particular Token value.

A9. The IOM 3 issues a Write operation to the AMA 30. The low order bits of the address designate this operation as a Return Message command, and specifies IOM 3. The Write data contains a "1" which is the Token value from step A7.

A10. The AMA 30 sets the vector bit space (cell) number 1 (which is the Token value taken from step A9) to indicate a "0" in that bit space. This indicates that the just-used message slot in system memory is now available for use by a later message operation.

A second illustration which will be illustrated by steps B1 through B16 involves the situation where the first CPM 1 and the second CPM 2 each send a message to the IOM 3. In this case, CPM 1 is considered the first sender, so that its message must be delivered first. Again, the initial conditions as referenced to FIG. 4, are such that Read, Write and Interrupt pointers all have the value of "1". The bit-space vectors for all of the bit numbers 0 through 255 are all supplied with the value of "0" in each cell of the vector. Also again, the main memory 14 has space allocated for the IOM 3 and all modules have the main memory addresses of their message storage area for each module so that they will communicate with and they have their own main memory message storage area address.

In the second situation where both the first and second CPMs are sending a message to the IOM 3, the following steps will occur:

B1. The CPM 1 issues a Read operation referencing the AMA 30 on the PCI bus 20. The low order bits of the address designate this as a "Get Token" command and specify the IOM 3 as the destination module.

B2. The AMA 30 completes the Read operation by returning the value of the Write pointer (=1) and advances the Write pointer by 1 (new value equals 2). The returned value is called the "Token". Steps B1 and B2 are called "atomic" because the AMA 30 always completes step B2 in response to step B1 before it will accept another operation.

Now making the assumption that control of the Intel P6 processor 18 is given over to the second CPM 2(16) and the use of CPM 1(12) is suspended, the following occurs:

B3. The CPM 2(16) issues a Read operation referencing the AMA 30 on the PCI bus 20. The low order bits of the address designate this as a Get Token command and specify the destination module as IOM 3.

B4. The AMA 30 completes the Read operation by returning the value of the Write pointer (=2) and advances the Write pointer by 1 (so that the new value is equal to 3). A returned value is called the "Token". Also, steps B3 and B4 are atomic, that is to say, step B3 and B4 occur together, because the AMA always completes step B4 in response to step B3, before it can accept another operation.

B5. The second CPM module 2 (CPM 2) copies its message into the main memory space 14 allocated for the IOM 3, using slot 2 in that space as designated by the Token value.

B6. The CPM 2 issues a Write operation to the AMA 30. The low order bits of the address designate this as a Return Token command and specify the IOM 3 as the receiving module. The Write data contains a "2" which is the Token value from step B4.

B7. The AMA 30 sets vector bit-space number 2 (FIG. 4) which is the token value taken from step B6, so that bit-space number 2 will now carry a value in the bit vector equal to "1". Since the Token value (=2) is not equal to the Interrupt pointer value (=1), then no Interrupt is generated.

Now it is assumed that control of the Intel P6 processor is returned to CPM 1 and CPM 2 is now suspended, the sequence then follows:

B8. The CPM 1 copies its message into the main memory space 14 allocated for the IOM 3, using slot 1 in that space as designated by the Token value taken from step B2.

B9. The CPM 1 issues a Write operation to the AMA 30. The low order bits of the address denotes this as a "Return Token" command and specify the receiver as IOM 3, thus identifying the Token queue for IOM 3 as having its message slot available again. The Write data contains a "1" which is the Token value taken from step B2.

B10. The AMA sets the vector bit-space number 1 (which is the Token value from step B7) to have a bit vector value equal to "1". Since now the Token value (=1) is equal to the Interrupt pointer value (=1), the AMA control logic signals the Interrupt logic in PCI interface 52 to interrupt the IOM 3. Then the AMA advances the Interrupt pointer by 1 so that its new value is equal to 2.

B11. The IOM 3 receives the Interrupt signal and issues a Read operation referencing the AMA 30 via the PCI bus 20. The low order bits of the address designate this operation as a "Get Message" command which specifies the IOM 3.

B12. The AMA 30 completes the Read operation by taking the message in main memory 14 (at the IOM 3 designated slot) and transmitting it to the IOM 3. The AMA returns the value of the Read pointer (=1). The returned value is again a "Token".

B13. The IOM 3 copies the message from its main memory 14 slot, using slot 1 of that space as designated by the Token value from step B10.

B14. The IOM 3 issues a Write operation to the AMA 30. The low order bits of the address designate this operation as a "Return Message" command which specifies the IOM 3. The Write data contains a "1" which is the token value from step B12.

B15. The AMA 30 then sets vector bit-space number 1 of FIG. 4 to show a value of "0" which is the Token value taken from step B14. This indicates that the message slot is now available for use by a later message operation. The AMA 30 advances the Read pointer by "1", so that its new value is now equal to "2". Since the value of the vector bit space in the bit-space number 2 is equal to "1", which is the new value of the Read pointer, the AMA 30 signals the PCI interface 52 to interrupt the IOM 3. If the value of the bit vector in bit space 2 were equal to "0", then no interrupt would be issued, since a "0" means there is no message associated with that slot in main memory 14. Also, since the Interrupt pointer contains the value "2", which is the same as the Read pointer, the Interrupt pointer is now advanced by "1" to provide it with a new value "3".

B16. This completes the second example. However, it is possible that several message sequences could take place before the first requester CPM 1 in this example, returns its token as stated in step B9. In this particular case, steps B11 through B15 would be repeated until the value in the bit vector space that is denoted by the Read pointer is equal to "0". At that point, no further interrupts would be generated until another sequence was initiated.

In order to set up the Auxiliary Message Arbitrator, there are several initialization operations needed for setting up operations. This includes setting all of the registers in the AMA 30 to "1", setting the Interrupt addresses, clearing the bit vector spaces, and setting the queue size limits. There are several bits in the memory-mapped address space of the AMA that can be used to signal these commands.

In the network of FIG. 2, it is possible for there to be 6 IOMs. Of these IOMs, 5 will have 3 receiving units which would be the IOU 44, the CMU 46 and the TCU 42. Further, there can be a maximum of 4 Central Processing Modules (CPM). Thus, there are 23 units possible in a large system. Of these, the CPMs only need a queue depth of two (messages from an IOU and a TCU). The queue depth for the other units is indeterminate, however, this may be placed as a depth of 64 for the TCU and 16 for the other units.

Since the various modules and units do not necessarily have contiguous addresses, then a form of mapping of the unit numbers into bit vectors is necessary to resolve this continuity, because the hardware must operate using sequential bit vectors.

The memory-mapped address space of the AMA 30 and the operation command structure may be mapped in a 4K window (TABLE 20A) with the following types of fields, which include a function field having 2 bits, the remaining address field of 20 bits, the command field of 3 bits, a single bit for the sender-receiver S/R, and a token field of 8 bits.

TABLE 20A

Memory Mapped Address Space of AMAM 30

| FUNCTION | ADDRESS FIELD | COMMAND | S/R | TOKEN |
|---|---|---|---|---|
| 2 BITS | 20 BITS | 3 BITS | 1 | 8 BITS |

Message Processing—RAM Organization:

The Auxiliary Message Arbitrator (AMA) 30 of FIG. 1A, is implemented using a static RAM-based storage of queue data and queue state data. The token values and the queued interrupts are stored in the TRAM, Token RAM 58 (FIG. 1A). The Control RAM 56 (CRAM 56) maintains a queue state for each of the queues. The message processing state machine in MPU 50 sequences the processing of the queue. The queue processing logic adjusts the queue state depending on the operation type. The queue state is used as pointers to get to the queue slot required to be read or written to, depending on the operation. There is also another queue state such as "queue empty" and also "interrupt" type. The Control RAM CRAM 56 also contains the interrupt address which is only used on soft interrupts.

The Token RAM 58 (TRAM) has an address map which is shown in Table 20B. For each of the 64 queue numbers, there are two 56×8 bit queues allocated. One is for an ordered list of three unallocated available tokens, and one for an ordered list of "outstanding message" tokens which represent messages that need to be passed onto the receiver associated with each queue.

For each of the two interrupt queues (hard and soft), there is one 256×8 bit queue, which is an ordered list of queue numbers that are waiting to go out onto the PCI bus 20. The utilization of these two queues should never exceed 63 entries, and in actual practice will rarely exceed several entries at once. In Table 20B, each slot in each queue contains one 8-bit value with an odd parity on it. The RAM is implemented in a single 32K×9 bit static RAM.

TABLE 20B

TRAM ADDRESS MAP:

| QUEUE NUMBER (64 Queue Numbers) | TRAM ADDRESS RANGE | ALLOCATION |
|---|---|---|
| Queue #4"3F" | 4"7F00"–4"7FFF" | Free Token Queue |
| 63 | 4"7E00"–4"7EFF" | Outstanding Message Queue |
| . | . | . |
| . | . | . |
| . | . | . |
| Queue #2 | 4"0500"–4"05FF" | Free Token Queue |
| 2 | 4"0400"–4"04FF" | Outstanding Message Queue |
| Queue #1 | 4"0300"–4"03FF" | Free Token Queue |
| 1 | 4"0200"–4"02FF" | Outstanding Message Queue |
| Queue #0 | 4"0100"–4"01FF" | Hard Interrupt Queue |
| 0 | 4"0000"–4"00FF" | Soft Interrupt Queue |

The address bits for the TRAM 58 are derived as indicated below. This also shows the diagnostic address access mapping. The data mapping in this queue is an 8-bit value which will stand for tokens for the queue numbers 1 through 3FH or queue numbers for the queue number 0.

The address bits for the Token RAM (TRAM) are shown in Table 21.

TABLE 21

TRAM ADDRESS BITS

| TRAM ADDRESS BITs | OPERATIONAL SOURCE | DIAGNOSTIC SOURCE |
|---|---|---|
| A16(NC) | Q#[7] | DADR[16] |
| A15(NC) | Q#[6] | DADR[15] |
| A14 | Q#[5] | DADR[14] |
| A13 | Q#[4] | DADR[13] |
| A12 | Q#[3] | DADR[12] |
| A11 | Q#[2] | DADR[11] |
| A10 | Q#[1] | DADR[10] |
| A9 | Q#[0] | DADR[9] |
| A8 | SELTKN | DADR[8] |
| A7 | PTR[7] | DADR[7] |
| A6 | PTR[6] | DADR[6] |
| A5 | PTR[5] | DADR[5] |
| A4 | PTR[4] | DADR[4] |
| A3 | PTR[3] | DADR[3] |
| A2 | PTR[2] | DADR[2] |
| A1 | PTR[1] | DADR[1] |
| A0 | PTR[0] | DADR[0] |

The structure of the Control RAM 56 (CRAM 56) is shown in Table 22 for one particular queue. This structure is repeated 64 times. The interrupt queues have the same structure as the normal queues.

TABLE 22

CRAM DATA STRUCTURE

| RELATIVE ADDRESS | DATA[31:8] | DATA[23:8] | DATA[15:8] | DATA[7:8] |
|---|---|---|---|---|
| 3 | 0 | 0 | 0 | INTRADR[35:4] |
| 2 | INTADR[31:8] | INTADR[23:8] | INTADR[15:8] | INTADR[7:8] |
| 1 | 0 | TKN UTILIZATION | TKN WR POINTER | TKN RD POINTER |
| 0 | =>FLAGS(1:2) | MSG UTILIZATION | MSG WR POINTER | MSG RD POINTER |

There are two flags which are implemented. Flag (0) is the "Get Message" flag. It is used for fast message queue emptying protocol. It is set active on a "Get Message" operation or on a "Return Token" operation, where an interrupt was queued, and inactive on a "Return Message" operation. On a "Get Message" operation, if the flag is set, it indicates the fast queue emptying protocol. Flag (1) is the "hard" interrupt flag. When set to a "1", the interrupt will be processed as a hard interrupt, and when reset, the interrupt will be processed as a soft interrupt.

The Table 23 below is an address map for the Control RAM 56 (CRAM 56).

TABLE 23

CRAM ADDRESS BITS

| ADDRESS BIT | OPERATIONAL SOURCE | DIAGNOSTIC SOURCE |
|---|---|---|
| A9 | Q#[7] | DADR[9] |
| A8 | Q#[6] | DADR[8] |
| A7 | Q#[5] | DADR[7] |
| A6 | Q#[4] | DADR[6] |
| A5 | Q#[3] | DADR[5] |
| A4 | Q#[2] | DADR[4] |
| A3 | Q#[1] | DADR[3] |
| A2 | Q#[0] | DADR[2] |
| A1 | SELINT | DADR[1] |
| A0 | SELTKN | DADR[0] |

Token And Control Ram Processing Logic: The AMA RAMs contain the queue data (TRAM 56) and the queue state (CRAM 58). They are processed in a uniform manner for all four message processing operations. The "Get Token", the "Return Token", the "Get Message", and the "Return Message Token" operations all need to access the queue state. For all four of these operations, FIG. 5 will be seen to illustrate the sequence that is used to access the CRAM state, and also to get the TRAM pointer and to access the TRAM 58.

Figure 5:
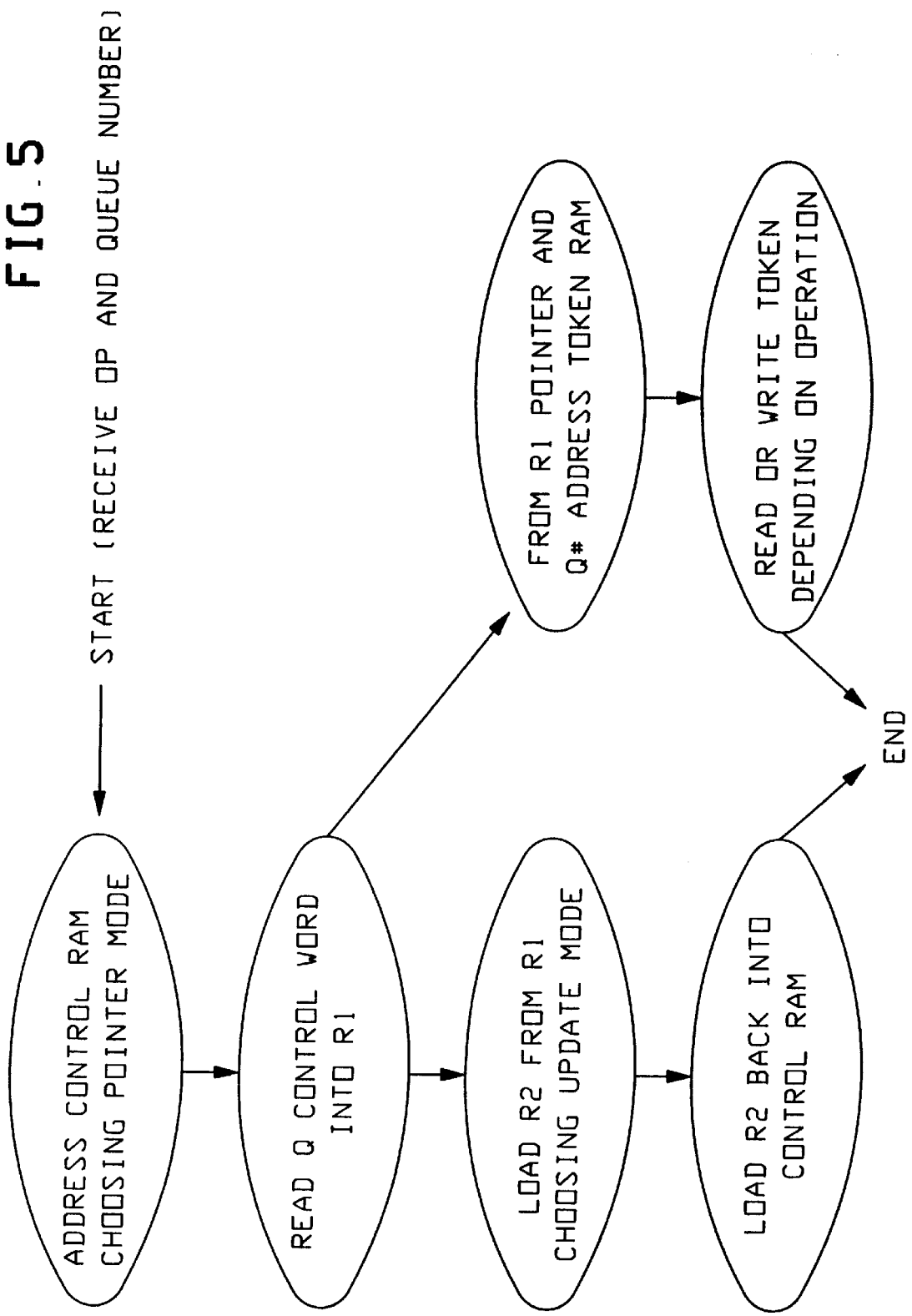
FIG. 5 is a drawing of the queue processing flow by the state machine to the Control RAM (CRAM)

Referring to FIG. 5, there is seen the AMA queue processing flow. The process starts when the AMA 30 receives an operation (OP) which comes along with a queue number. Both can be derived from the 16-bit lower address portion of the memory mapped command received across the PCI bus 20. From the queue number, the upper portion of the CRAM 56 is addressed. Based on that and the OP code, the state machine in MPU 50 points to the correct Control RAM (CRAM) address in CRAM 56.

Figure 6:
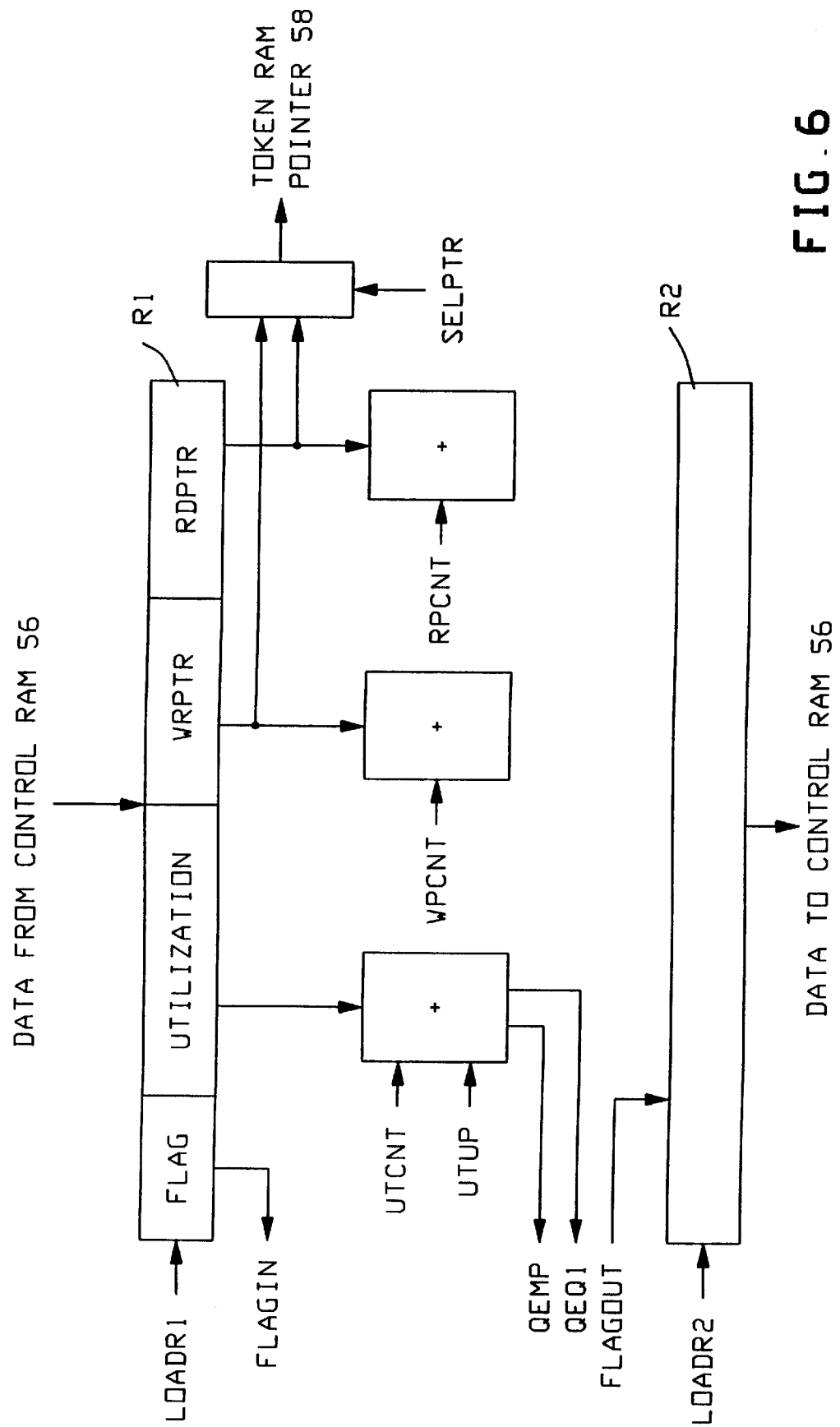
FIG. 6 is a diagram of the Control RAM (CRAM) processing logic.

As will be seen in FIG. 6 which illustrates the CRAM processing logic, the CRAM is always loaded by entry into Registers R1 and R2. The processing of the data between R1 and R2 is dependent on the state machine outputs. The utilization counters in FIG. 6 may count up or down or not. Also, the pointers may count up or not count up. After the adjusted data is loaded into R2 of FIG. 6, it is written back into the Control RAM 56 (CRAM 56). This Control RAM "Write" is aborted if the queue is found to be empty.

In FIG. 6, the data loaded into R1 also serves as a portion of the Token RAM 58 address. It, along with the queue number, and the selection of which queue is being accessed, completes the Token RAM address (TRAM 58). Either the Token queue or the Message queue will be accessed. For the interrupt queues, the queue number will be forced to "0". A signal SELTKN (Select Token) will be set to a "1" in order to point to the hard interrupt queue and set to "0" to point to the soft interrupt queue.

Each operation is handled the same way except with the state machine's control options which will vary depending on the operation. The detection of an empty queue will cause an operation "abort" resulting in the RAM state remaining unchanged. Some operations require multiple RAM access cycles. The "Return Message Token" operation, for example, requires one cycle to dequeue the return token and then another cycle to enqueue the freed token.

Table 24 is an illustration of the queue processing modes. It shows the state machine control settings for the different queue handling modes.

TABLE 24

QUEUE PROCESSING MODES

| CONTROL SIGNAL | TOKEN DE-Q | MSG EN-Q | MSG DE-Q | TOKEN EN-Q | INT EN-Q | INT DE-Q | RD INT ADDR |
|---|---|---|---|---|---|---|---|
| UTCNT | 1 | 1 | 1 | 0 | 1 | 1 | 1 | 1 |
| UTUP | 0 | 1 | 0 | | 1 | 1 | 0 | 0 |
| WPCNT | 0 | 1 | 0 | | 1 | 1 | 0 | 0 |
| RPCNT | 1 | 0 | 1 | 0 | 0 | 0 | 1 | 1 |
| SELTKN | 1 | 0 | 0 | | 1 | HRD=1 | HRD=1 | 0 |
| SELWPTR | 0 | 1 | 0 | | 1 | 1 | 0 | 0 |

TABLE 24-continued

QUEUE PROCESSING MODES

| CONTROL SIGNAL | TOKEN DE-Q | MSG EN-Q | MSG DE-Q | TOKEN EN-Q | INT EN-Q | INT DE-Q | RD INT ADDR |
|---|---|---|---|---|---|---|---|
| SELQNUM | 0 | 0 | 0 | 0 | 1 | 1 | 0 |
| SELINT | 0 | 0 | 0 | 0 | 0 | 0 | 1 |
|  | SET TOKEN | RETURN TOKEN | RETURN MSG | GET MSG | RETURN MSG | RETURN TOKEN | RETURN TOKEN |

Referring to FIG. 7, there is shown a drawing of the TRAM datapath for the Token RAM 58. The internal queue number can be selected by the state machine to be either (i) hardwired to a "0" line 58a; or (ii) line 58d from the Token Data Register 58tr; or (iii) line 58p from the PCI BIU 52. The TRAM data can be selected by the state machine to be either: (i) PCI BIU's (52) Token data on line 52b; (ii) the Token RAM 58 on line 58a; (iii) the PCI BIU's queue number on line 58p or (iv) the Token Data Register, 58tr.

The Token Data Register 58tr allows the Token data to be moved from one TRAM address to another, which is done on a message dequeue operation. It also allows the Token data to become the internal queue number which is done on soft interrupt dequeuing operations.

Interrupt Queue Handling: Interrupt queues are handled very much like message queues, and the same hardware structures are used but they are sequenced a little bit differently. Some extra logic is involved like the internal queue number generation. The hard and the soft interrupt queues are both handled the same as the normal queues, but with the queue number "0" referenced as the internal queue number. Hard interrupts are queued in what would be the free token queue for the normal queues, soft interrupts in the message queue area. Soft interrupt dequeuing reads out the interrupt address from the Control RAM 56 (CRAM 56) in addition to accessing the Token RAM (TRAM) value.

There are two interrupt queues:—(i) the hard interrupt queue and (ii) the soft interrupt queue. As to which interrupt queue will be used is determined by the interrupt-type flag, FLAG(1). This is initialized in the Control RAM 56 (CRAM) at system initialization time. A "1" in this field distinguishes a PCI "hard" interrupt type of Message Receiver. This Message Receiver would be a soft module, such as—a P6 program. A "0" in this field FLAG (0) designates a memory mapped interrupt Message Receiver. This would be a hard module—a CIOM or a IPI processor board.

In the case of the interrupt enqueuing, the queue number of the Message Receiver is written into the bottom of the message queue for queue number "0". The Write pointer and the queue utilization is then incremented by "1".

The dequeuing of the interrupt queue for "hard" interrupts, involves forcing the queue number "0"internally and then performing a dequeuing operation with the signal SELTKN set to a "1". The Token RAM's message queue would contain a queue number that would be loaded into the interrupt response register in the MPU 50, FIG. 1A. The interrupt would then be set active on the PCI bus 20. A "hard interrupt pending" signal tells the message handler state machine that a new interrupt may be initiated. The state machine maintains this and also a flag indicates that the hard interrupt queue is empty or not empty, so that the state machine does not need to pull the RAM contents to detect the non-empty queue state.

In response to the hard interrupt, the P6 program must perform a "Read interrupt" response operation to get the queue number. The receiver would then follow up with a "Get Message" operation to the indicated queue number.

The dequeuing of the interrupt queue for soft interrupts involves forcing the queue number "0"internally, and then performing a dequeuing operation with a signal SELTKN (FIG. 7) set to a "0". First the queue number is dequeued from the top of the queue. This dequeued number is then written into the Token Data Register 58tr in the TRAM logic 58 of FIG. 7. The Token Data Register 58tr is selected as the internal queue number. Then the interrupt address is read out and loaded into the "Soft Interrupt Queue Number" register, which is in the PCI BIU 52 (Bus Interface Unit). The high 4 bits and then the low 32 bits are written into the Bus Interface Unit 52 across the 32 bit interface (I/F) over to the PCI BIU 52.

A Soft Interrupt Pending flag from the PCI BIU 52 tells the message handler state machine that a new interrupt may be initiated. The state machine maintains a hardware flag that indicates that the Soft Interrupt Queue (FIG. 1B) is empty or not empty, so that the state machine does not need to poll the RAM contents in order to detect the non-empty queue state.

In response to the "Soft Interrupt", the hard module would then follow-up with a "Get Message" operation to the correct queue number. Each soft interrupt type of Message Receiver must know the queue number that corresponds to a particular interrupt address, and be able to act as a memory target for that particular address.

Figure 8A:
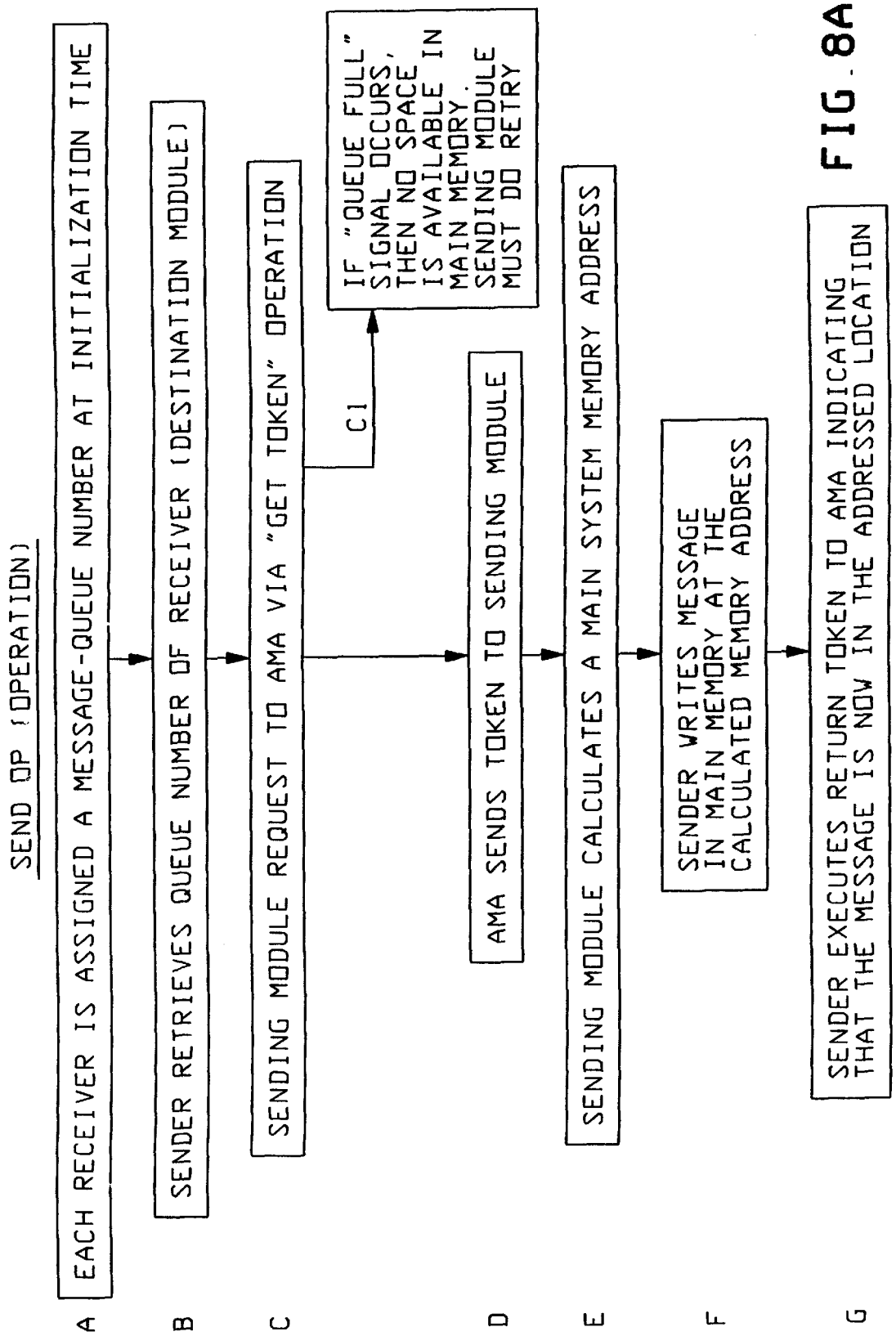
FIG. 8A is a flow chart illustrating steps of a Send OP (operation)

Referring to FIG. 8A, there is seen an operational flow chart for the Send operation (SEND OP).

Figure 1D:
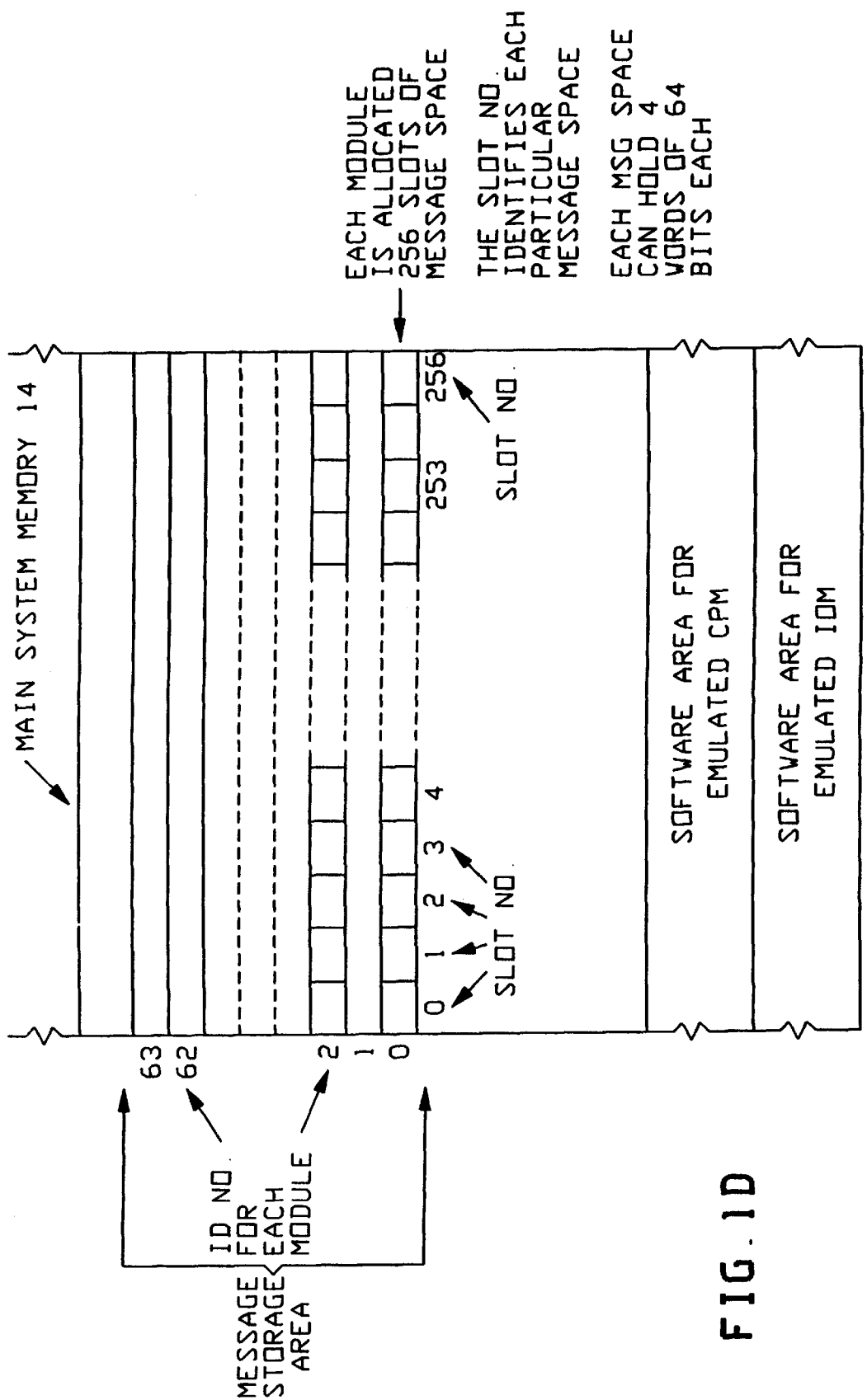
FIG. 1D is a diagram of the Main System Memory indicating modules being emulated in software program.

As seen at step A, each receiver module is assigned a message-queue number during initialization time by the system console which message-queue number dedicates a section of main system memory 14 to that particular module. As indicated in FIG. 1D, the message queue which is dedicated to each module will have up to 256 slots wherein each slot can hold a 4-word message.

At step B, the sending module retrieves the queue number (identification) of the receiver (destination module). For example, if a CPM wants to send to a particular IOM, it tells the system that it needs the queue number of the IOM so that it will know which area of main memory is dedicated to that receiver IOM.

At step C, the sending module makes a request to the Auxiliary Message Arbitrator 30 (AMA) using the "Get Token" operation. At the situation of C1, if a queue "full" signal occurs, this indicates that no space is presently available in main memory for the message and the sender will need to retry the operation later.

At step D, the AMA 30 sends a "token" to the Sending Module. The token represents a particular slot in the main memory area which is dedicated to the designated Receiving Module and into which the sending module will put the message temporarily until it can later be retrieved by the designated Receiving Module. Table 11 indicates an example of a token of eight bits.

At step E, the sending module calculates the main system memory address and at step F, the sender writes the message in main memory at the calculated memory address after which, at step G, the sender executes a return of the token to the AMA 30 to indicate that the message has now been placed in the address location. This location is that particular slot in the main memory queue which is represented by the token that the AMA gave to the sending module.

Now referring to FIG. 8B, there is seen a flow chart indicating a sequence of steps in the Get Message operation. This sequence will follow after the previous step sequences of step A to step G.

The Get Message operation starts at step H. Here the AMA executes an interrupt signal and sends it to the Receiving Module to notify the Receiving Module that a message is waiting for it in system main memory.

At step I, the Receiving Module receives the interrupt signal and executes a "Get Message" operation (OP) via the AMA.

At step J, the AMA supplies the token number for that particular Receiving Module which points to the system main memory address where the message for that Receiving Module is stored.

At step K, the Receiving Module then reads the message from the system main memory and copies this information into its Receiving Module register.

At step L, the Receiving Module returns its "Message Token" back again to the AMA 30 in order to clear that particular message slot for future use. At step M, the Receiving Module can now accept and receive the next interrupt which would ordinarily end the sequence.

At step N, after each interrupt to the Receiving Module, the Receiving Module can execute a "Get Message" OP until the "Empty Flag" is set in the message queue. Additionally, as seen as step N, there is a "Fast Empty" system procedure which is available when a series of messages is still applicable to that particular Receiving Module. In this case only one initial interrupt is necessary whereupon the Receiving Module executes a series of "Get Message" OPs without the need for intervening interrupts in order to receive the full complement of messages residing and available in the main memory message slots of that particular Receiving Module.

Described herein has been a method for control of message transfers in a network supporting both hardware implemented digital modules which require different types of interrupt sequences for hardware and software.

While a preferred embodiment of the invention has been described, the method involved is encompassed by the following claims.

What is claimed is:

1. A network utilizing digital hardware modules and software emulated digital modules placed as software in Main System Memory, wherein a Central Processing Module, a PC Processor, and Main System Memory providing, for each one of N modules, a dedicated message queue, identified by a queue number, having "M" message slots, which modules are connected via a system bus which bridges to a PCI bus holding a plurality of hardware Input/Output Modules and a hardware Auxiliary Message Control Module providing algorithmic control sequences for sending messages to dedicated queues in Main System Memory for retrieval by a receiving destination module and utilizing a Token RAM to provide sequential token values for sending modules to access Main Memory plus utilizing a Control RAM with Read, Write and Interrupt pointers for said algorithmic control sequences, a method for regulating the transfer of messages between sending modules and receiving modules, including the steps of:

(a) establishing a separate queue in a Main System Memory for each one of said "N" digital modules in the network;

(b) assigning each digital module a message-queue number which represents a series of "M" message holding slots in each one of said N message queues dedicated to each particular receiving destination module, each said message queue having Flag means to indicate that the queue is "Empty" or "Not Empty";

(c) providing a Token value to a requesting sending module which Token value identifies a particular message slot in a message queue dedicated to said receiving destination module said Token value being provided in such a rapid sequential fashion so as to prevent any lockup with a concurrently requesting sending module;

(d) receiving, by said sending module, of said provided Token value and using it to calculate a Main System Memory address for placing a message destined for said receiving destination module;

(e) writing a message from said message-sending module into the main Memory queue in the slot designated by said Token value;

(f) returning the Token value, by said sending module, back to said Token RAM, thus indicating that the message from the sending module is now residing in the addressed Main Memory queue and slot for the receiving destination module;

(g) signaling an Interrupt to the receiving destination module to indicate that a message is waiting for it;

(h) receiving of the Interrupt by the receiving destination module in order to execute a "Get Message" operation via said Auxiliary Message Control Module to said Main System Memory;

(i) providing a Token value from said Auxiliary Message Control Module, to said receiving module, which can be used to calculate the System Main Memory address where the message is stored said token value being provided to said receiving module in such a rapid sequential fashion so as to prevent any lockup with a concurrently requesting receiving module;

(j) reading, by said receiving destination module, the message residing in said message queue in said Main System Memory;

(k) returning, by said receiving destination module, of the message Token value just used, back to said Token RAN in said Auxiliary Message Control Module.

2. A network utilizing digital hardware modules and software emulated digital modules placed as software in Main System Memory, wherein a Central Processing Module, a PC Processor, and Main System Memory providing, for each module, a dedicated message queue, identified by a queue number, having "M" message slots, which modules are connected via a system bus which bridges to a PCI bus holding a plurality of hardware Input/Output Modules and a hardware Auxiliary Message Control Module providing algorithmic control sequences for sending messages to dedicated queues in Main System Memory for retrieval by a receiving destination module and utilizing a Token RAM to provide sequential token values for sending modules to access Main memory plus utilizing a Control RAM with Read, Write and Interrupt pointers for said algorithmic control sequences, a method for regulating the transfer of messages between sending modules and receiving modules, including the steps of:

(a) establishing a separate queue in a Main System Memory for each one of "N" digital modules in the network;

(b) assigning each digital module a message-queue number which represents a series of "M" message holding slots in each one of said N message queues dedicated to each particular receiving destination module, each said message queue having Flag means to indicate that the queue is "Empty" or "Not Empty":

(c) providing a Token value to a requesting sending module which Token value identifies a particular message slot in a message queue dedicated to said receiving destination module;

(d) receiving, by said sending module, of said provided Token value and using it to calculate a Main System Memory address for placing a message destined for said receiving destination module;

(e) writing a message from said message-sending module into the Main Memory queue in the slot designated by said Token value;

(f) returning the Token value, by said sending module, back to said Token RAM, thus indicating that the message from the sending module is now residing in the addressed Main Memory queue and slot for the receiving destination module;

(g) signaling an Interrupt to the receiving destination module to indicate that a message is waiting for it;

(h) receiving of the Interrupt by the receiving destination module in order to execute a "Get Message" operation via said Auxiliary Message Control Module to said Main System Memory;

(i) providing a Token value from said Auxiliary Message Control Module, to said receiving module, which can be used to calculate the System Main Memory address where the message is stored;

(j) reading, by said receiving destination module, the message residing in said message queue in said Main System Memory;

(k) returning, by said receiving destination module, of the message Token value just used, back to said Token RAN in said Auxiliary Message Control Module;

(m) utilizing a fast empty sequence by using a series of Get Message operations to retrieve a series of messages from said receiving destination module's message queue with only one initial Interrupt signal being used to initiate the sequence, thus eliminating any intervening Interrupts.

3. The method of claim 1 which includes the step of:

(m) sensing said "Empty Flag" signal of step (b) to terminate said Get Message operation of step (h).

4. A network utilizing digital hardware modules and software emulated digital modules placed as software in main System Memory, wherein a Central Processing Module, a PC Processor, and Main system memory providing, for each module, a dedicated message queue, identified by a queue number, having "M" message slots, which modules are connected via a system bus which bridges to a PCI bus holding a plurality of hardware Input/Output Modules and a hardware Auxiliary Message Control Module providing algorithmic control sequences for sending messages to dedicated queues in Main System memory for retrieval by a receiving destination module and utilizing a Token RAM to provide sequential token values for sending modules to access Main memory plus utilizing a Control RAM with Read, Write and Interrupt pointers for said algorithmic control sequences, a method for regulating the transfer of messages between sending modules and receiving modules, including the steps of:

(a) establishing a separate queue in a Main System Memory for each one of "N" digital modules in the network;

(b) assigning each digital module a message-queue number which represents a series of "M" message holding slots in each one of said N message queues dedicated to each particular receiving destination module, each said message queue having Flag means to indicate that the queue is "Empty" or "Not Empty";

(c) providing a Token value to a requesting sending module which Token value identifies a particular message slot in a message, queue dedicated to said receiving destination module;

(d) receiving, by said sending module, of said provided Token value and using it to calculate a Main System memory address for placing a message destined for said receiving destination module;

(e) writing a message from said message-sending module into the Main Memory queue in the slot designated by said Token value;

(f) returning the Token value, by said sending module, back to said Token RAM, thus indicating that the message from the sending module is now residing in the addressed Main memory queue and slot for the receiving destination module;

(g) signaling an Interrupt to the receiving destination module to indicate that a message is waiting for it on the basis of:

(g1) generating a hard Interrupt signal when said receiving destination module is a hardware module;

(g2) generating a soft Interrupt signal when said receiving destination module is a software-emulated digital module;

(h) receiving of the Interrupt by the receiving destination module in order to execute a "Get Message" operation via said Auxiliary Message Control Module to said Main System Memory;

(i) providing a Token value from said Auxiliary Message Control Module, to said receiving module, which can be used to calculate the System Main Memory address where the message is stored;

(i) reading, by said receiving destination module, the message residing in said message queue in said Main System Memory;

(k) returning, by said receiving destination module, of the message Token value just used, back to said Token RAM in said Auxiliary Message Control Module.

5. A system for regulating the sequential transfer of messages between multiple sending modules and multiple receiving modules in a network utilizing a message control system whereby no possible deadlock can occur between two concurrently requesting modules seeking a message token, and wherein the network utilizes digital hardware modules and software emulated digital modules which are placed as software in main system memory, and wherein a central processing module, an auxiliary processor utilizes a main system memory to provide a dedicated message queue for each of "N" digital modules, each identified by a queue number having "M" message slots, which modules are connected via a system bus which bridges to a PCI bus holding a plurality of hardware input/output modules and a hardware Auxiliary Message Control module providing algorithmic control sequences for sending messages to dedicated queues in main system memory for retrieval by a receiving destination module and utilizing a Token RAM to provide sequential Token values in order to access main memory, and additionally utilizing a Control RAM with Read, Write, and Interrupt pointers for said algorithmic control sequences, said system ensuring that all messages will be transferred in the proper time sequential order and with no delays due to deadlocks, said system comprising:

(a) queue means in said main system memory being dedicated for each one of said "N" digital modules in the network;

(b) means to provide each digital module in said network with a message-queue number, which represents a series of "M" message holding slots in each one of said "N" message queues dedicated to each particular destination module;

(c) token RAM means to provide a token value to each requesting module whereby said token value identifies a particular message slot in a message queue dedicated to the said receiving destination module said token value being provided in a rapid sequential fashion which will prevent any deadlock condition with other requesting modules;

(d) means, in a said sending module, to calculate a main system memory address for placing a message in it destined for said receiving destination module;

(e) means to place a message from said message-sending module into the main memory queue in the slot designated by said token value;

(f) means, in said sending module, to return the token value back to said token RAM to indicate that the message from the sending module is now residing in the addressed main memory queue and numbered slot for the receiving destination module;

(g) means to signal with an interrupt signal to the receiving destination module to indicate that a message is waiting for the said receiving destination modules;

(h) means by said destination module to execute a "get message" operation via said Auxiliary Message Control module to said main system memory;

(i) means in said Auxiliary Message Control module to provide a token value to said receiving module which can be used by said receiving module to calculate the system main memory address where the message is stored;

(j) means in said receiving destination module to access and read the message residing in said message queue in said main system memory;

(k) means in said receiving destination module to return the message token value just used, back to said token RAM in said Auxiliary Message Control module.

6. The system of claim 5 whereby said means to signal an interrupt to the receiving destination module to indicate that a message is waiting for it, includes:

(i) means to generate a hard interrupt signal to the receiving destination module when said receiving destination module is a hardware module;

(ii) means to generate a soft interrupt signal when said receiving destination module is a software-emulated digital module.

* * * * *